US010737914B2

(12) United States Patent
Giles et al.

(10) Patent No.: US 10,737,914 B2
(45) Date of Patent: Aug. 11, 2020

(54) OFFSHORE CRANE

(71) Applicant: W3G Shipping Ltd., Aberdeen, Aberdeenshire (GB)

(72) Inventors: John Giles, Aberdeen (GB); Alan West, Aberdeen (GB)

(73) Assignee: W3G SHIPPING LTD., Aberdeen, Aberdeenshire (GB)

( * ) Notice: Subject to any disclaimer, the term of this patent is extended or adjusted under 35 U.S.C. 154(b) by 748 days.

(21) Appl. No.: 14/419,835

(22) PCT Filed: Aug. 15, 2013

(86) PCT No.: PCT/GB2013/052170
§ 371 (c)(1),
(2) Date: Feb. 5, 2015

(87) PCT Pub. No.: WO2014/027201
PCT Pub. Date: Feb. 20, 2014

(65) Prior Publication Data
US 2015/0158704 A1 Jun. 11, 2015

(30) Foreign Application Priority Data
Aug. 16, 2012 (GB) .................................. 1214656.9

(51) Int. Cl.
*B66C 13/06* (2006.01)
*B66C 23/18* (2006.01)
(Continued)

(52) U.S. Cl.
CPC ............ *B66C 13/06* (2013.01); *B66C 23/185* (2013.01); *B66C 23/52* (2013.01);
(Continued)

(58) Field of Classification Search
CPC ........ B66C 13/06; B66C 23/185; B66C 23/52; Y02E 10/72; Y02P 70/523;
(Continued)

(56) References Cited

U.S. PATENT DOCUMENTS 8,313,266 B2 * 11/2012 Numajiri ................ B63B 27/10
405/195.1
2005/0019166 A1 * 1/2005 Bervang ................ B66C 1/108
416/244 A
(Continued)

FOREIGN PATENT DOCUMENTS

BE          1020670 A4      3/2014
CN          101429928 B     9/2011
(Continued)

OTHER PUBLICATIONS

European Examination Report for application No. 13773309.3 dated Sep. 15, 2017, 6 pages.
(Continued)

*Primary Examiner* — Michael R Mansen
*Assistant Examiner* — Juan J Campos, Jr.
(74) *Attorney, Agent, or Firm* — Myers Bigel, P.A.

(57) ABSTRACT

The invention relates to a crane, such as a hoisting crane (3000) having a hoisting boom (3010) having a lifting region (3020), configured to lift a load (3050) and an actuatable restraint device (3040), the device extending from the crane. The actuatable restraint device is configured to engage with a load being lifted, so as to control movement of that load with respect to the lifting region in at least one direction. The actuatable restraint device may be configured to control movement in as much as inhibiting, or mitigating, certain movement.

36 Claims, 20 Drawing Sheets

(51) Int. Cl.
  *B66C 23/52* (2006.01)
  *E02B 17/02* (2006.01)
  *E02B 17/00* (2006.01)
  *F03D 13/10* (2016.01)

(52) U.S. Cl.
  CPC ........ *E02B 17/0004* (2013.01); *E02B 17/027* (2013.01); *F03D 13/10* (2016.05); *E02B 2017/006* (2013.01); *E02B 2017/0039* (2013.01); *E02B 2017/0091* (2013.01); *F05B 2230/61* (2013.01); *F05B 2230/6102* (2013.01); *Y02E 10/72* (2013.01); *Y02P 70/523* (2015.11)

(58) Field of Classification Search
  CPC .......... F05B 2230/61; F05B 2230/6102; F03D 13/10; E02B 2017/0039; E02B 2017/006; E02B 2017/0091
  See application file for complete search history.

(56) References Cited

U.S. PATENT DOCUMENTS

| | | | | |
|---|---|---|---|---|
| 2008/0216301 A1* | 9/2008 | Hansen | ............... | B66C 1/108 29/428 |
| 2011/0094987 A1* | 4/2011 | Botwright | ............... | B66C 1/108 212/274 |
| 2011/0221215 A1* | 9/2011 | Botwright | ............... | B66C 1/108 294/81.4 |
| 2011/0272377 A1* | 11/2011 | Willim | ............... | B66C 13/06 212/285 |
| 2012/0061341 A1* | 3/2012 | Richter | ............... | B66C 13/06 212/348 |
| 2013/0125397 A1* | 5/2013 | Van den Berg | ......... | B66C 23/56 29/889 |

FOREIGN PATENT DOCUMENTS

| | | |
|---|---|---|
| DE | 102009058268 A1 | 6/2011 |
| GB | 2 252 295 A | 8/1992 |
| WO | 2011028102 | 3/2011 |
| WO | WO 2012/175171 | 12/2012 |
| WO | WO 2013/093614 A1 | 6/2013 |
| WO | WO 2014/033682 A1 | 3/2014 |
| WO | WO 2014/097254 A1 | 6/2014 |

OTHER PUBLICATIONS

Notification of Transmittal of the International Search Report and the Written Opinion of the International Searching Authority, or the Declaration corresponding to International Application No. PCT/GB2013/052170 dated Dec. 13, 2013.

Communication pursuant to Rule 114(2) EPC reporting third party observations for EP Application No. 13773309.3, dated Nov. 6, 2018, 3 pages.

* cited by examiner

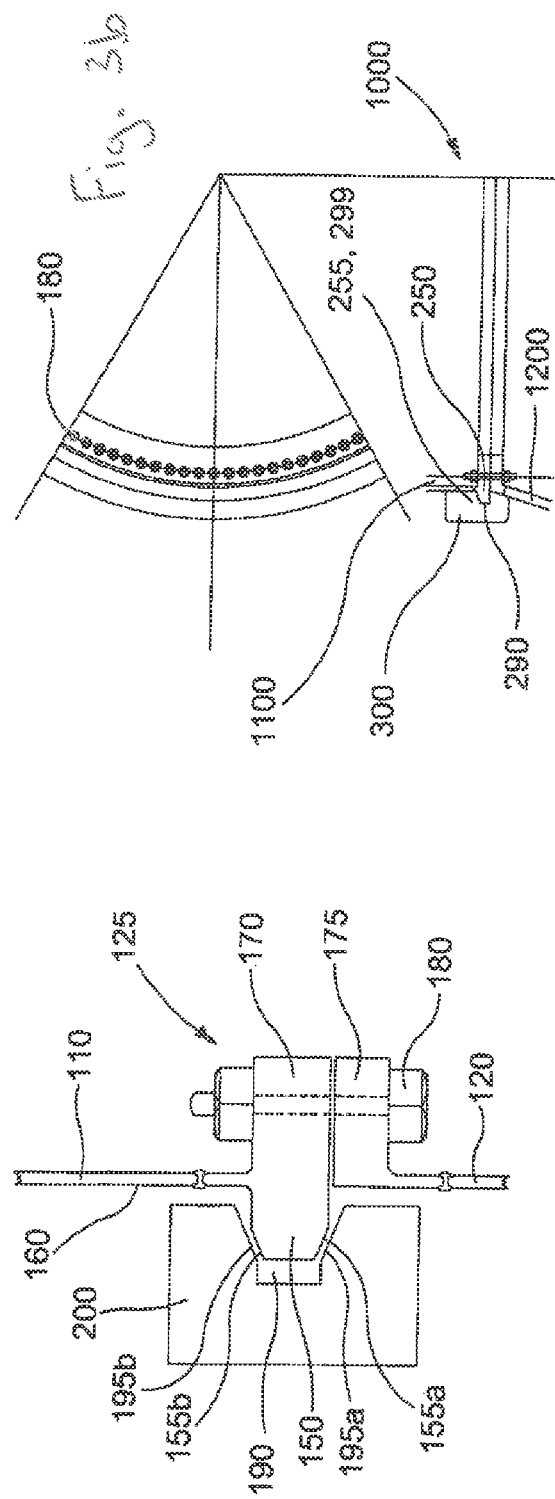
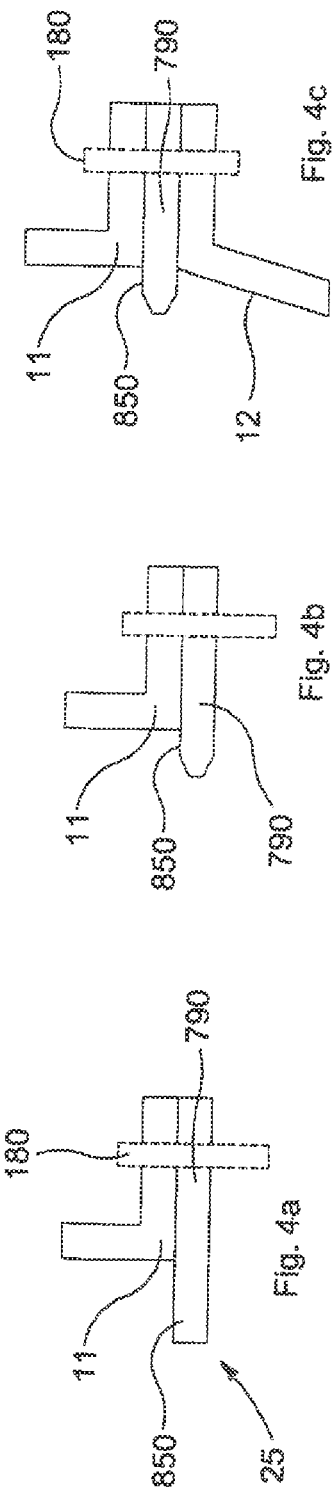

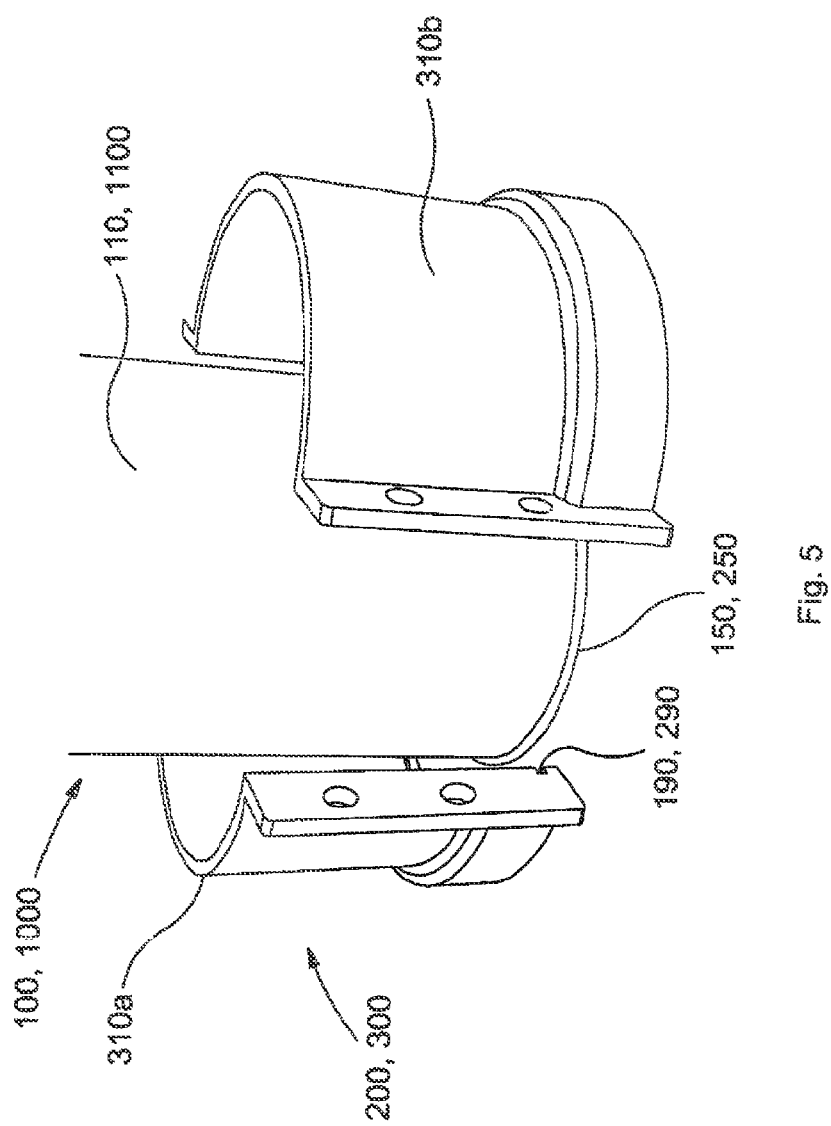

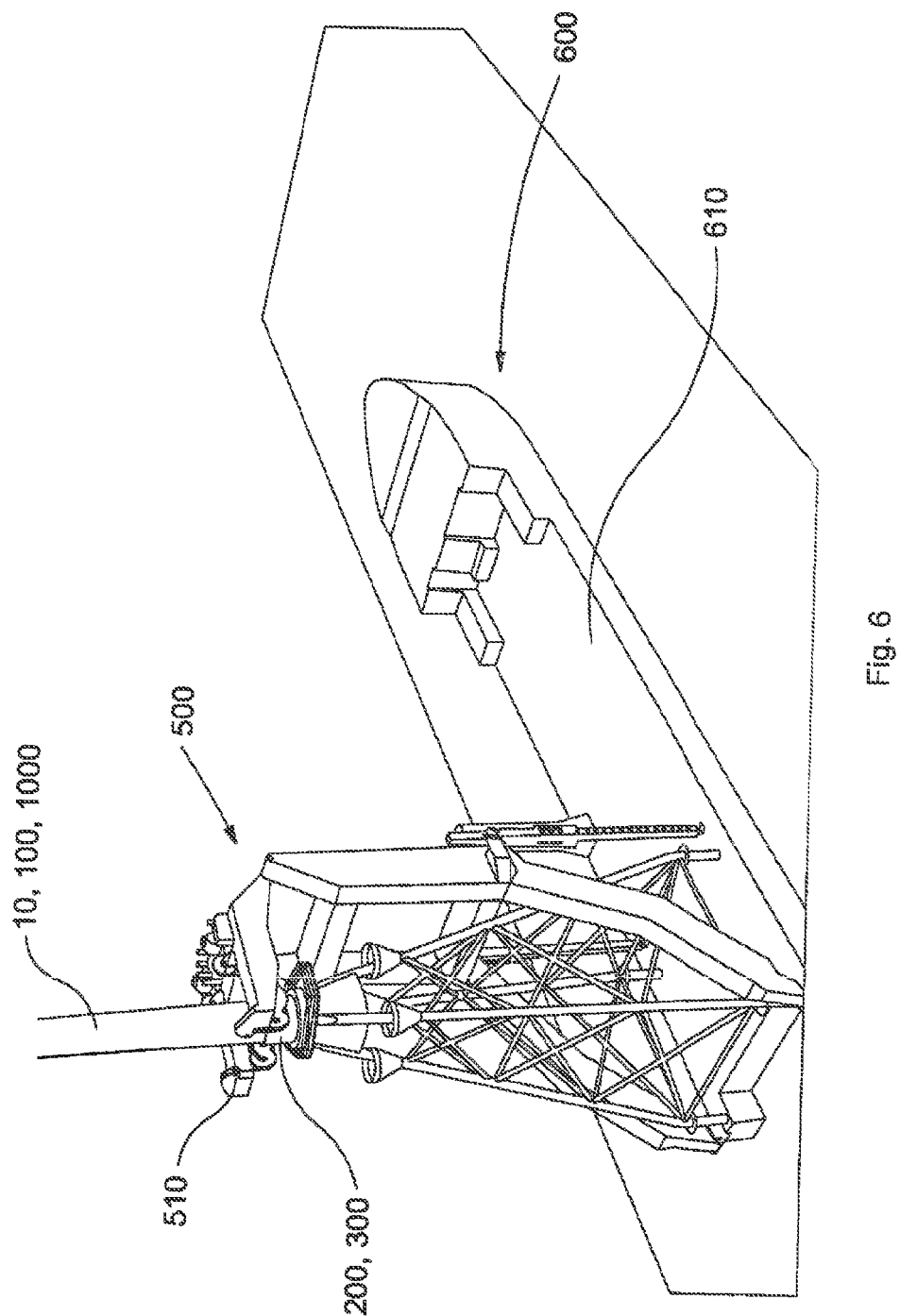

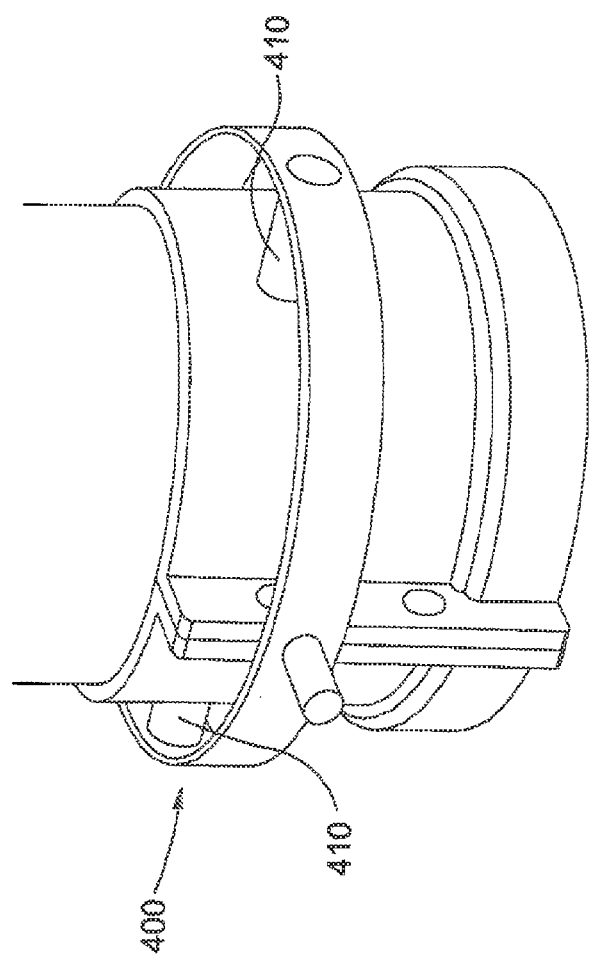

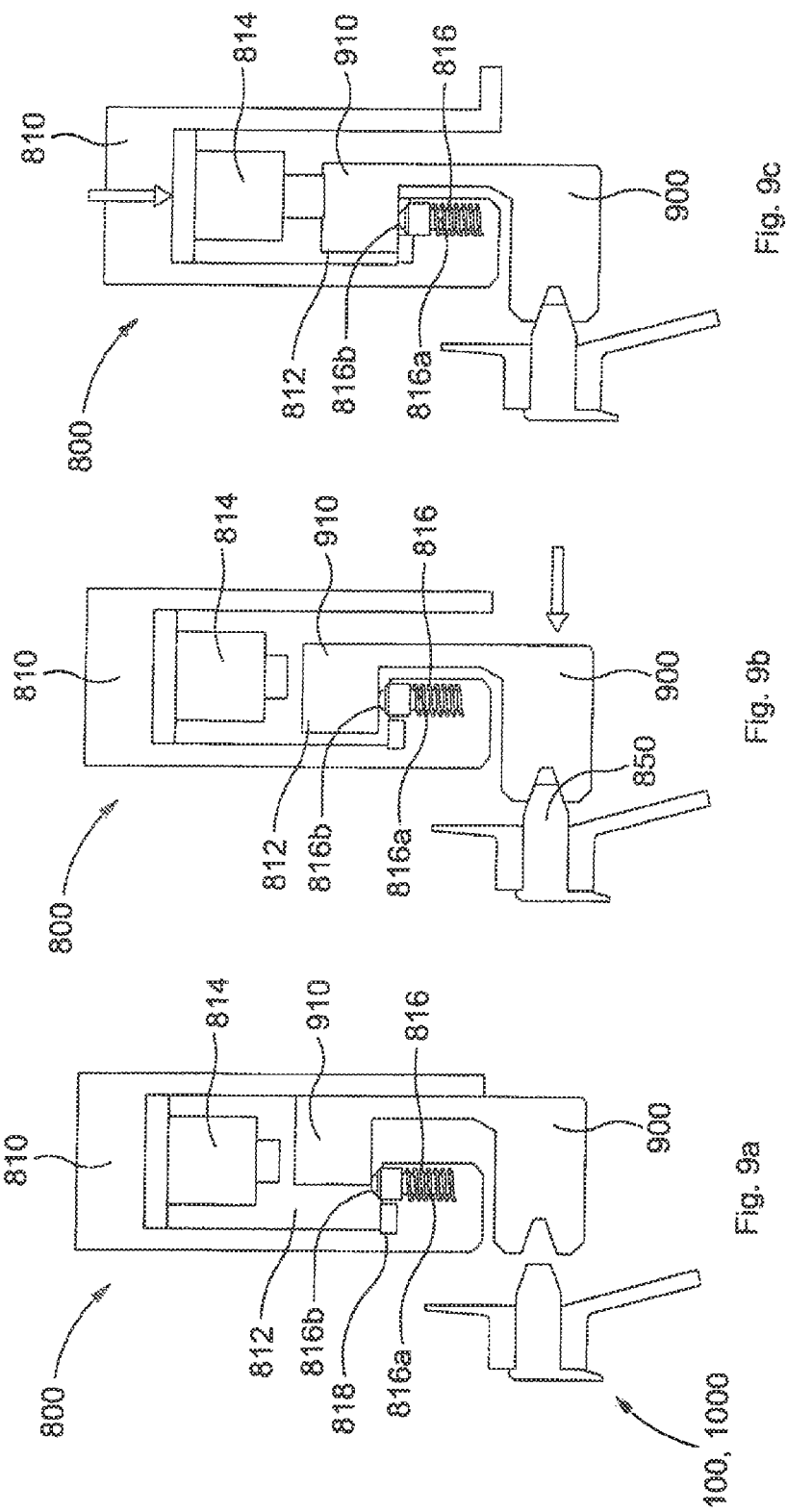

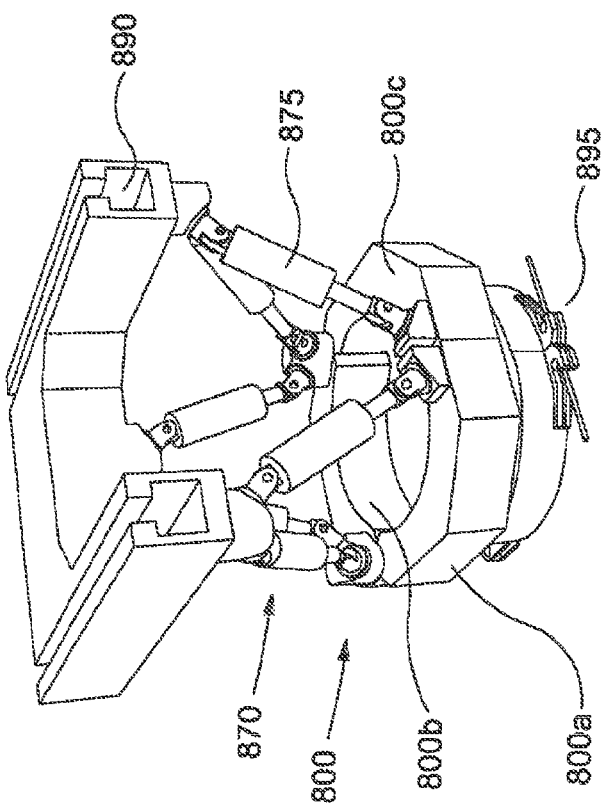
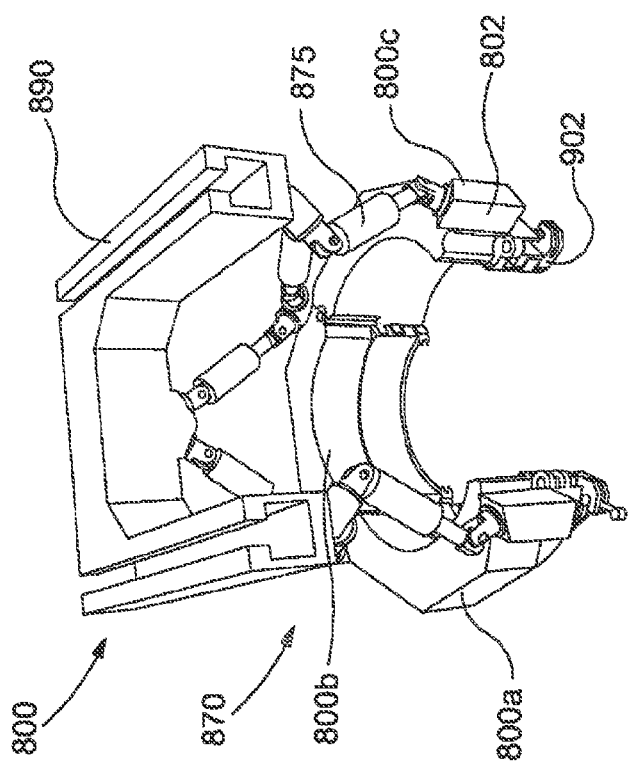

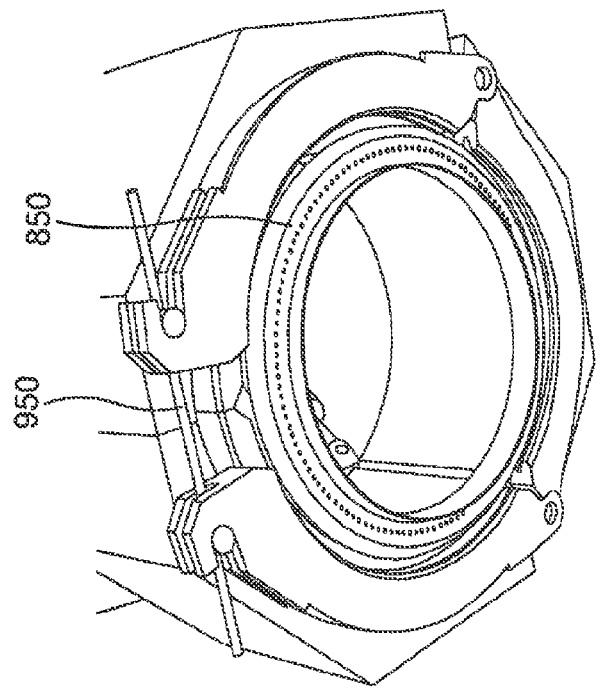
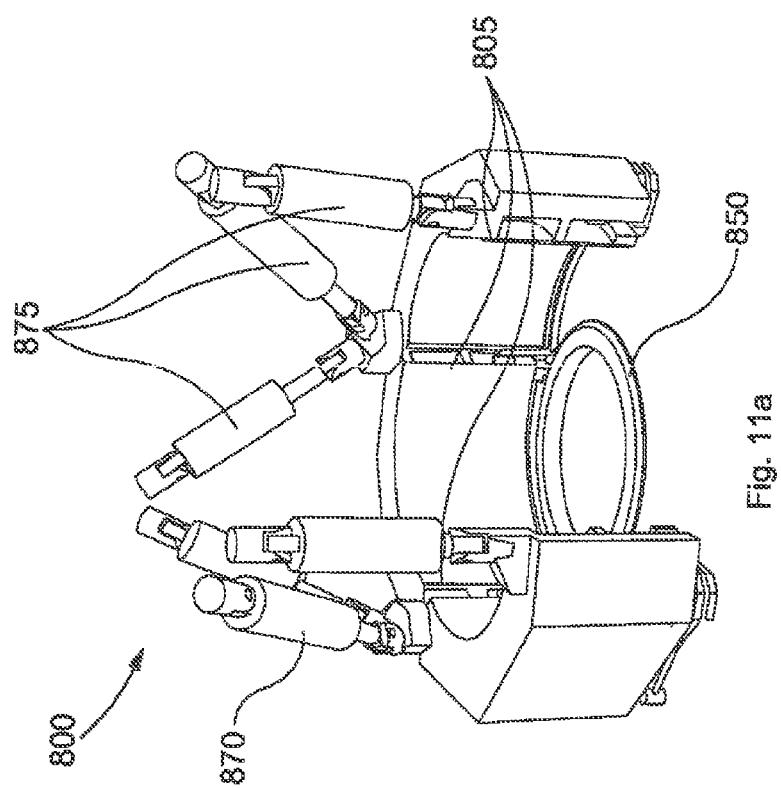

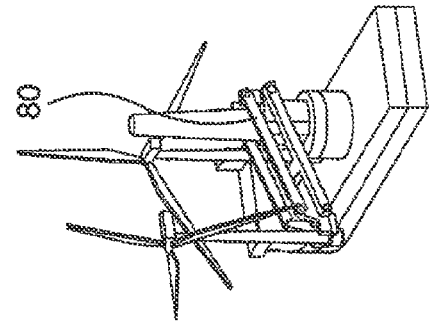

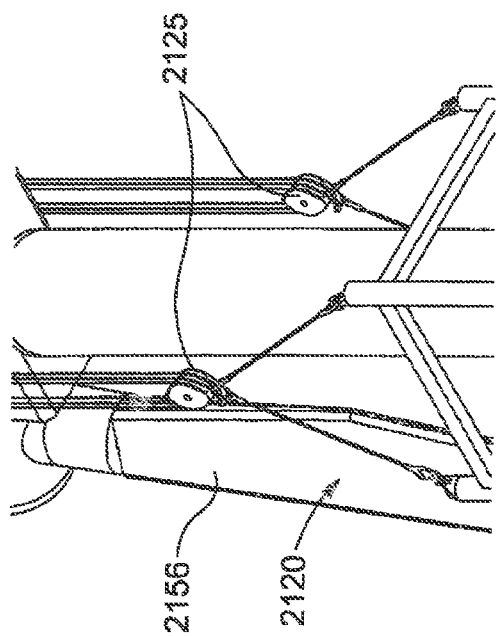
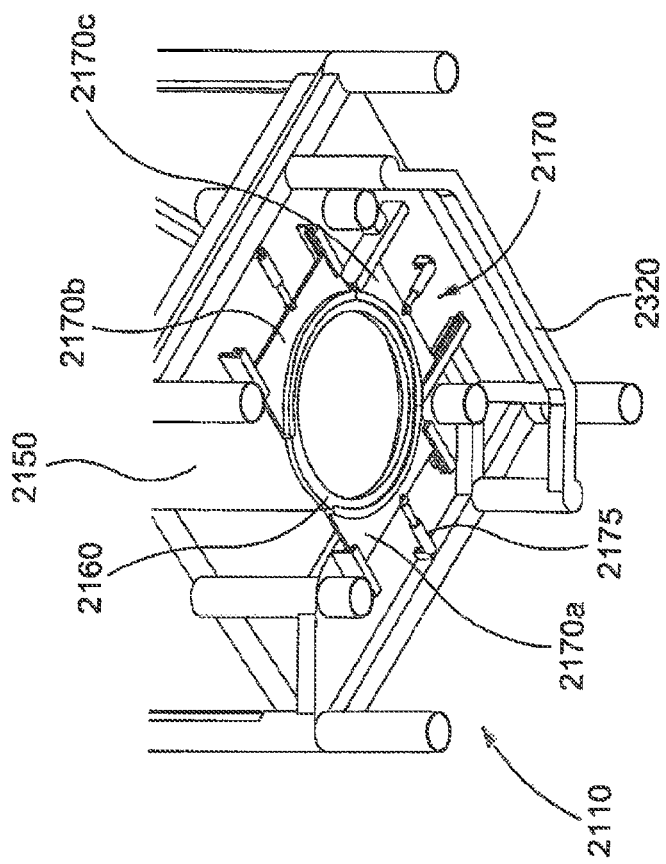
Fig. 15a
Fig. 15b

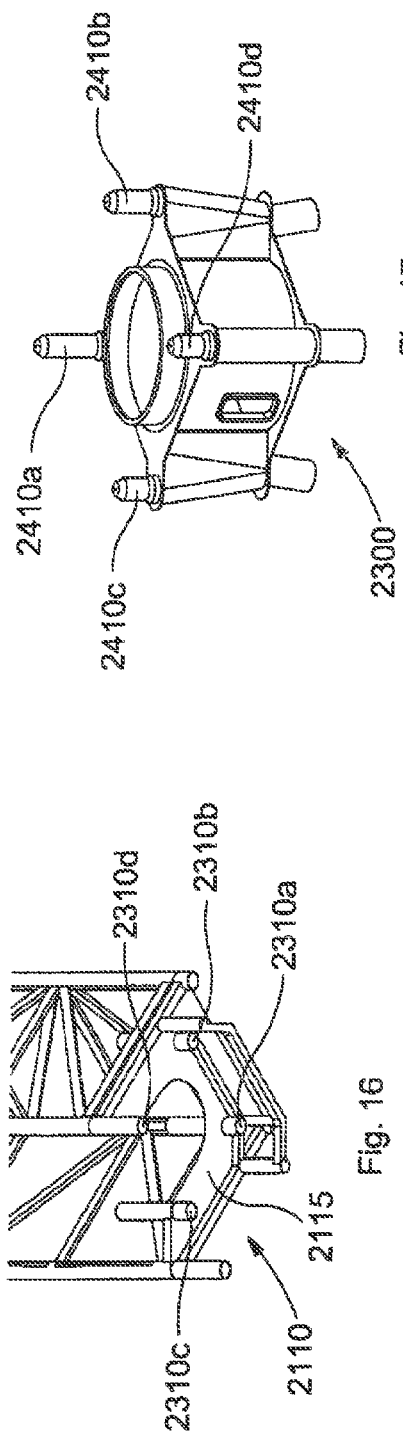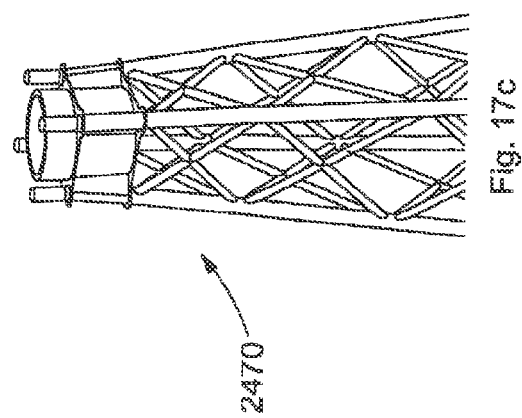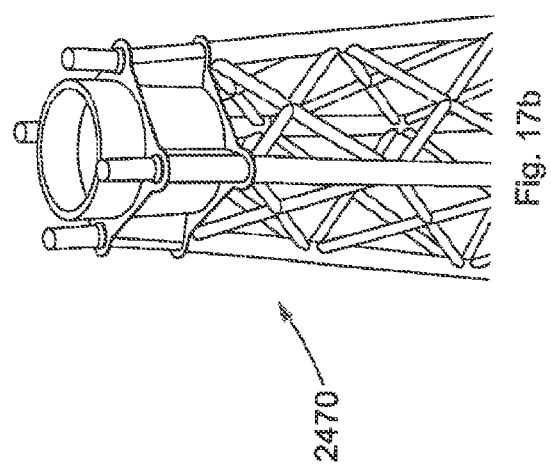

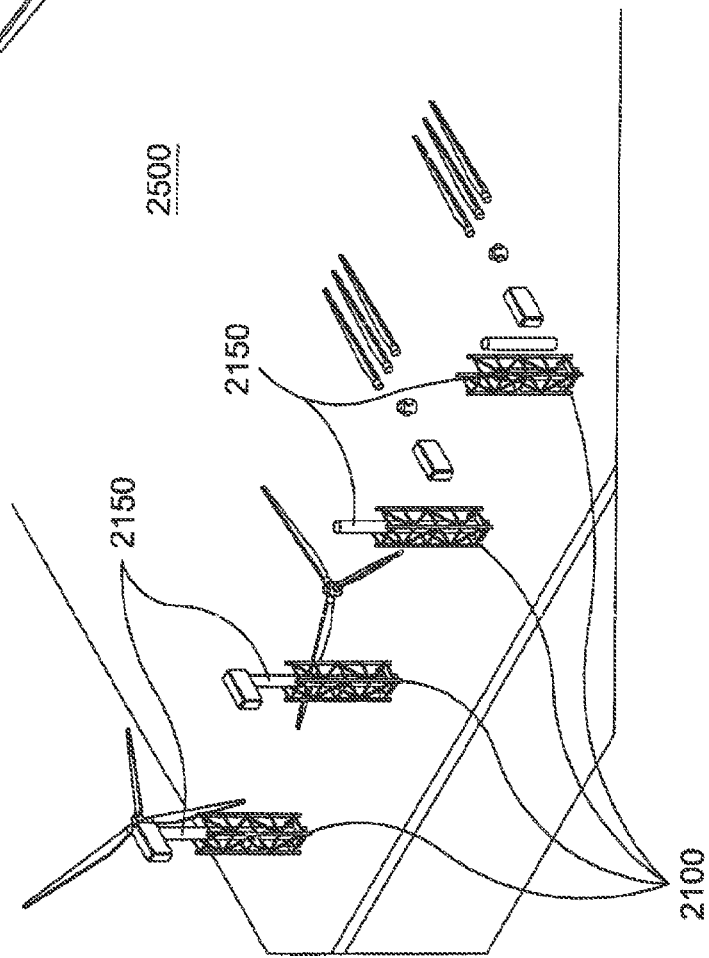
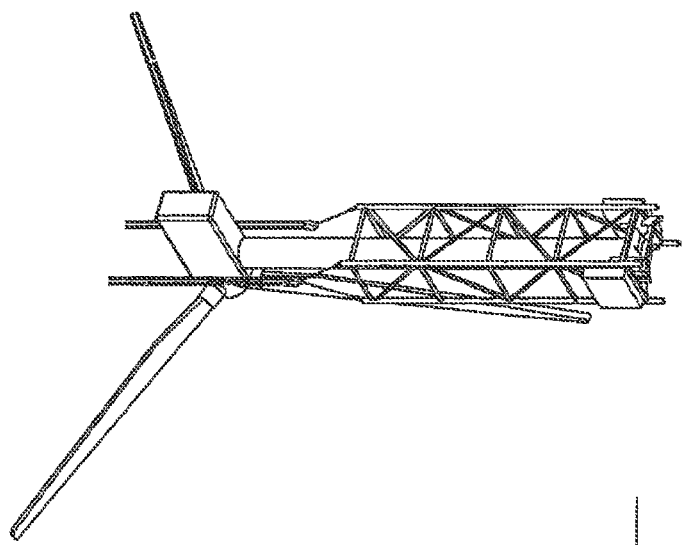
Fig. 18a
Fig. 18b

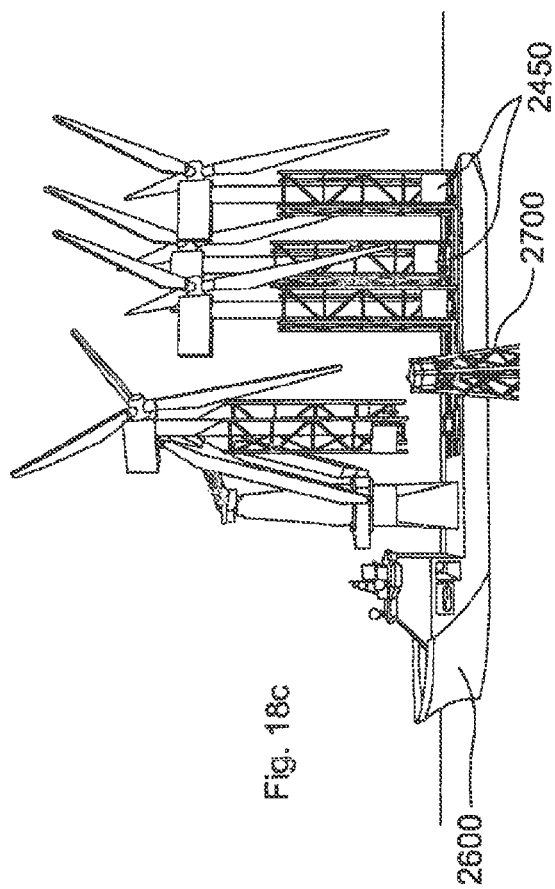
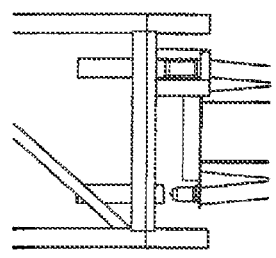
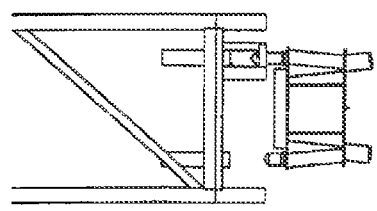

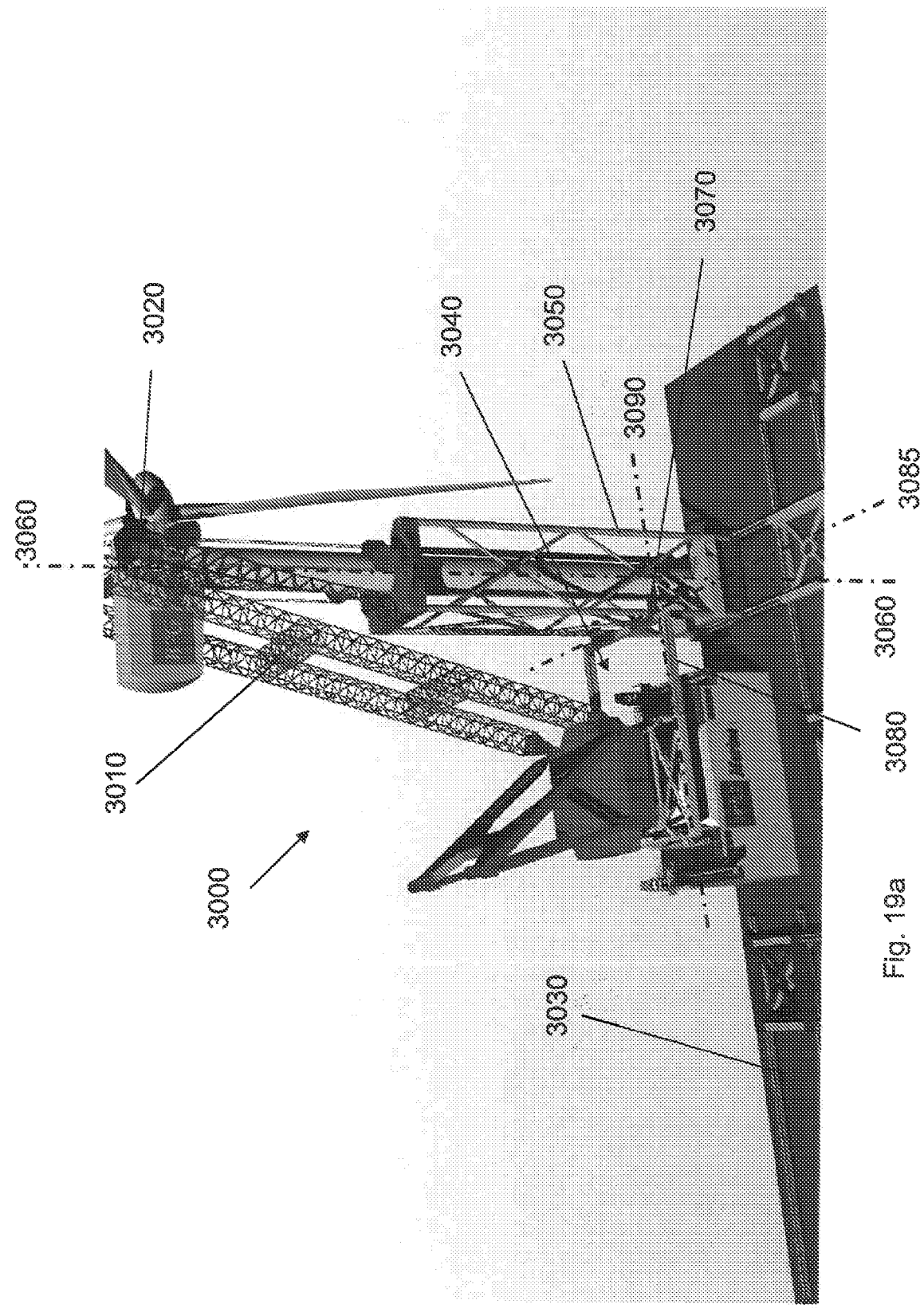

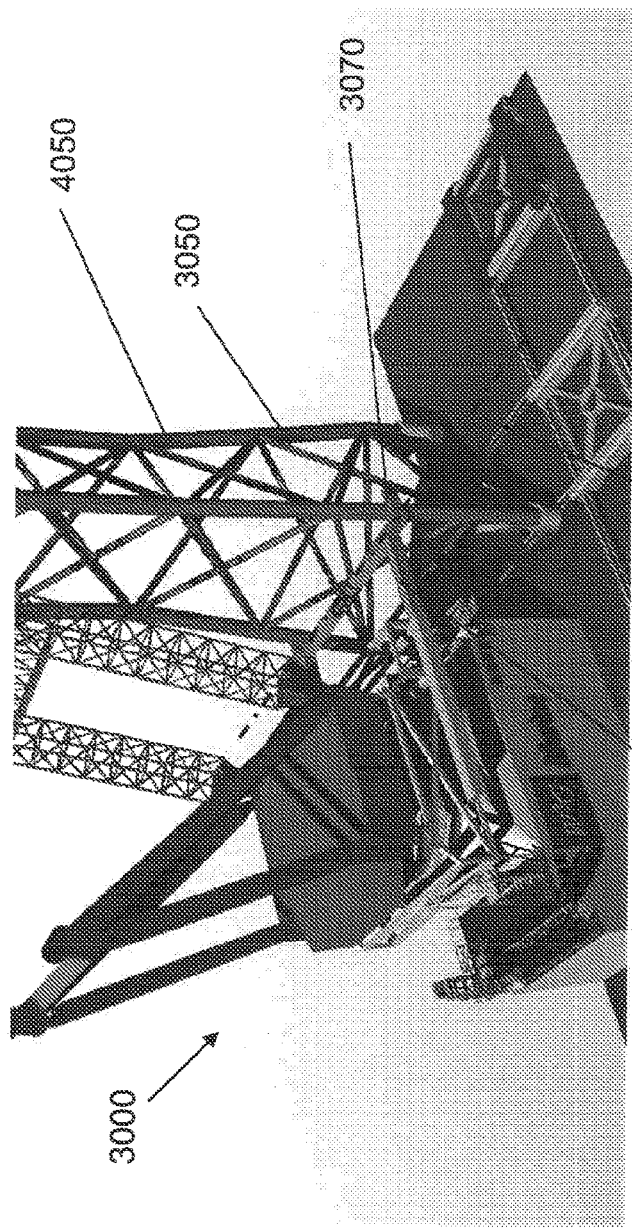
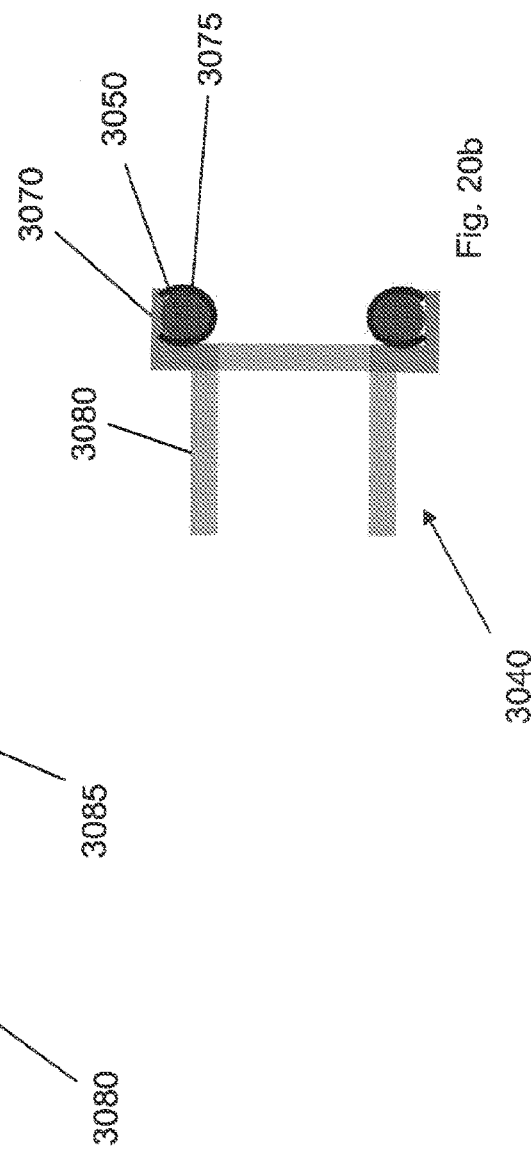
Fig. 20a
Fig. 20b

OFFSHORE CRANE

RELATED APPLICATIONS

This application is a 35 U.S.C. § 371 national stage application of PCT Application No. PCT/GB2013/052170, filed on Aug. 15, 2013, which claims priority from British Application No. 12 14 656.9 filed on Aug. 16, 2012, the contents of which are incorporated herein by reference in their entireties. The above-referenced PCT International Application was published as International Publication No. WO 2014/027201 A1 on Feb. 20, 2014.

TECHNICAL FIELD

The invention relates to the field of structures, such as offshore structures, associated apparatus and methods. In particular, though not exclusively, the invention relates to offshore structures, such as wind turbine structures, and/or apparatus for transport of those offshore structures, as well as associated apparatus and methods, such as cranes, or the like.

The structures, apparatus and methods may be used onshore (e.g. at a construction site) or offshore (e.g. on a vessel, or at an offshore site).

BACKGROUND

Offshore sites, such as offshore wind farms, can prove challenging to establish and/or maintain. The size and complexity of the structures involved, and environmental factors, such as weather and sea conditions, can mean that it can be difficult to construct and/or maintain such sites.

At present, wind turbines and their associated structures are separately constructed onshore, and transported in sections to an offshore site. There, they are moved into position and fixed using slings and cranes. Subsequently, the completed structures are tested.

As the desire for offshore wind farms increases, there is a desire to locate wind turbines structures in deeper water, e.g. deeper than 30 m, such as greater than 45 m. Generally, deeper water sites are further from the shoreline than shallower water sites. Because of the time and complexity involved in establishing sites, such as those in deeper water, the costs can be relatively expensive. In addition, mating of a wind turbine tower with a pre-existing support (e.g. jacket, monopile, transition piece, or the like) has proven challenging, not least of because of the accuracy that is required when aligning a wind turbine tower with that pre-existing support to allow for successful mating of the structures.

In a similar manner, offshore structures not limited to those for use with wind turbines (e.g. jackets, monopiles, oil and gas structures, etc.), are commonly transported to and from offshore sites with the use of cranes, slings, floating crane barges, etc. The use slings and cranes can be hazardous, particularly when the weather conditions are poor.

In addition, when transporting offshore structures—such as wind turbine structures—there is a desire to mitigate, as much as practically possible, inertial effects that arise due to excessive movement. Such inertial effects may cause harm to the structure. For example, it can be desirable when transporting a wind turbine to ensure that the turbine does not experience acceleration (i.e. forces) beyond certain thresholds.

In addition, poor weather conditions can reduce the ability, or at least time window, with which to deploy such offshore structures.

This background serves to set a scene to allow a skilled reader to better appreciate the following description. Therefore, none of the above discussion should necessarily be taken as an acknowledgement that that discussion is part of the state of the art or is common general knowledge. One or more aspects/embodiments of the invention may or may not address one or more of the background issues.

SUMMARY

According to a first aspect of the invention there is provided a wind turbine structure for an offshore site.

The structure may comprise a transport element. The transport element may be configured for complementary mating with an engagement element. The engagement element may be of a clamp, and configured to allow for transport of the structure using a clamp.

Transport of the structure may include lifting of the structure, such as lifting at an onshore and/or offshore site. Transport of the structure may include providing for installing of the structure at an offshore site. Transport of the structure may include restraining of the structure during transport to or from an offshore site. Transport of the structure may include lifting and/or restraining of the structure.

The transport element may be configured to extend around, such as externally around, some or all of the structure. The transport element may be annular. The transport element may comprise one or more protrusions. The transport element may comprise one or more flanges, or be comprised with a flange. The transport element may be configured such that a clamp is provided around, such as externally around, the transport element.

The transport element may be configured with a plurality of protrusions and/or recesses. The transport element may comprise a region of increased strength and/or rigidity, with respect to the structure.

The transport element may comprise one or more tapered portions. The tapered portion(s) may be radially tapered. The transport element may be configured to provide for interference mating with an engagement element (e.g. recess) of a clamp. The transport element may be configured such that the one or more tapered portions provide for mating with one or more complementary tapered portions of an engagement element. The mating may be interference mating. First and second tapered portions may be provided so as to face away from one another. First and second complementary tapered portions may face one another.

The structure may comprise a tower. The tower may be for supporting a turbine, nacelle, etc. The transport element may be comprised with the tower. The tower may be configured to attach to a support, such as a transition piece, jacket, monopile, or the like. The transport element may be provided at an attachment region of the tower. The attachment region may be configured to attach to a support. The transport element may be provided with a flange used for attachment of the tower and a support.

The structure may be configured such that a clamp exhibits some or all of a clamping force on the transport element. The structure may be configured such that a clamp exhibits no clamping force on the structure, apart from at the transport element.

The structure may comprise an interface portion. The interface portion may be configured to allow for attachment of a tower and a support. In other words, the interface portion may be provided between a tower and a support, which may in some cases provide a structure. The transport element may be provided with the interface portion. The transport element may be provided with a flange used for attachment of the interface portion with a tower and a support.

The structure may comprise a support, such as a transition piece, jacket, monopile, etc. The support may be configured for attachment to seafastening sockets.

The structure may be configured such that the centre of gravity of the structure is provided below the transport element, such as when orientated in situ. In other words, the structure may be configured such that the centre of gravity may be below the transport element when the structure is configured to be upright, or vertical, with respect to the intended orientation of the structure (e.g. in use).

According to a second aspect of the invention there is provided apparatus for allowing for transport of a wind turbine structure.

The apparatus may comprise a clamp. The clamp may have an engagement element configured for complementary mating with a transport element of a structure to allow for transport of a structure.

Transport of a structure may include lifting of a structure, such as lifting at an onshore and/or offshore site. Transport of a structure may include providing for installing of a structure at an offshore site. Transport of the structure may include restraining of a structure during transport to or from an offshore site. Transport of a structure may include lifting and/or restraining of a structure.

The clamp may comprise two or more clamp portions. Some or all of the clamp portions may comprise the engagement element. The two or more clamp portions may be configured as a split clamp. The clamp portions may be separable to allow for insertion and clamping of a structure. The clamp may be configured to surround, or mostly surround an associated structure. The clamp (e.g. clamp portions) may be opened and/or closed using one or more pistons. Each clamp portion may be associated with one or more pistons. The clamp portions may be configured to open/close radially. The clamp may comprise three clamp portions.

The engagement element may be configured to extend around some or all of the clamp. The engagement element may be annular. The engagement element may comprise a recess, or groove. The engagement element may be configured with a plurality of protrusions and/or recesses.

The engagement element may comprise one or more tapered portions. The tapered portion(s) may be radially tapered. The engagement element may be configured to provide for interference mating with a transport element of a structure. The engagement element may be configured such that the one or more tapered portions provide for mating with one or more complementary tapered portions of a transport element. The mating may be interference mating. First and second tapered portions may be provided so as to face away from one another. First and second complementary tapered portions may face one another.

The apparatus may be configured for use with a structure comprising a tower. Such a tower may be for supporting a turbine, nacelle, etc. The clamp may be configured for use with an attachment region of a tower of a structure. The clamp may be configured to extend along a portion of the structure, when in use. The engagement element may be provided at a lower section of the clamp, with respect to structure when in situ, or being lifted and/or restrained. The apparatus may be configured to increase the rigidity of a structure, when in use.

The engagement element may be configured for use with a transport element comprised with a tower of a structure. Such a tower may be configured to attach to a support, such as a transition piece, jacket, tripod, gravity base, monopile, or the like. Such a support may be considered to be a substructure. The engagement element may be configured for mating with a transport element of an attachment region of a tower, support, or the like. Such an attachment region may be configured to attach to a support, tower, or the like. The engagement element may be configured for mating with a flange used for attachment of a tower and a support of a structure. The engagement element may be configured for mating with a tower and a support of a structure at a flange used for attachment of the tower and support.

The engagement element may be configured for mating with an interface portion of a structure. Such an interface portion may be configured to allow for attachment of a tower and a support. The interface portion may be configured to be positioned between a tower and a structure. The engagement element may be configured for mating with a flange used for attachment of an interface portion with a tower and a support. The engagement element may be configured for mating with an interface portion at a flange of the tower and a support.

The apparatus may comprise a restraining region. The restraining region may comprise the clamp. The restraining region may be configured to restrain a structure so as to associate the apparatus with a structure and mitigate movement of an associated structure with respect to the apparatus. The apparatus may comprise a lifting region configured to allow for lifting of an associated structure. The apparatus may be configured so as to modify an effective centre of gravity of an associated structure, from that of an un-associated structure, in order to allow for ease of transport (e.g. ease of lifting, restraining, etc.).

Additionally, or alternatively, the apparatus may be configured so as to modify an effective centre of inertia of an associated structure, from that of an un-associated structure, in order to allow for ease of transport (e.g. lifting).

The restraining region may be considered to be a connecting region (e.g. usable to connect the apparatus to a structure, such as by using the clamp).

The apparatus may be configured to modify the effective centre of gravity and/or inertia of an associated structure by lowering the effective centre of gravity, and/or inertia. The apparatus may be configured to modify the effective centre of gravity and/or inertia to be roughly at the lifting region. The apparatus may be configured to modify the effective centre of gravity and/or inertia to be roughly at a lifting point of the lifting region. The lifting point may be associated with the location at which the apparatus is configured for communication (e.g. attachment) with lifting apparatus (e.g. a hoist, crane, or the like).

The apparatus may be configured to lower the effective centre of gravity and/or inertia below, or further below, the lifting region or lifting point, when the apparatus is associated with a structure. The apparatus may be configured such that the effective centre of gravity and/or the lifting region is above the restraining region, when a structure is associated, and oriented for lifting.

The apparatus associated with a structure may be considered an assembly. A centre of gravity and/or inertia of the assembly may be lower than that of a structure, per se.

The apparatus may comprise one or more ballasts. The ballast(s) may be configured to allow for modifying, or additionally modifying, the effective centre of gravity and/or inertia of an associated structure. The ballast(s) may allow for variable ballast to be added to and/or removed from the apparatus. The ballast(s) may be configured to store water, such as sea water. The ballast(s) may be comprised within the apparatus. The ballast(s) may be provided externally to the apparatus.

The apparatus may be configured for association with an attachment region of a structure or support (e.g. a region for attaching a structure to a support, such as a jacket or transition piece, or the like). The restraining region may be configured for association with an attachment region of a structure or support (e.g. a region for attaching the structure to a support, such as a jacket or transition piece, or the like). Such an attachment region may be the location at which a structure attaches to a support (e.g. the region at which a wind turbine tower attaches to a jacket or transition piece).

The apparatus may be configured to extend along a structure, when associated (e.g. partially, substantially or fully along). The apparatus may be configured to surround, substantially, partially or fully around a structure, when associated. The apparatus may be essentially constructed as a frame. The apparatus may comprise main struts (e.g. four main struts), which are connected (e.g. connected on three sides) to define an exterior to the apparatus. One side of the apparatus (e.g. between particular main struts) may allow for insertion and removal of a structure. This maybe considered to be a gated side. The apparatus may be provided with a gate, which may be usable to open and close to allow insertion/removal/retention of a structure.

The apparatus may be configured for mounting with a coupling mount. The apparatus may comprise one or more mounting elements configured to allow the apparatus to mount with a coupling mount. The one or more mounting elements of the apparatus may be configured for associating (e.g. complementary mating) with mounting elements of a coupling mount.

Such a coupling mount may be configured for use onshore, and/or configured for use during transit (e.g. when transporting a structure to an offshore site). Such a coupling mount may be configured for use on the deck of a vessel.

Such a coupling mount may be configured for use with a support, such as a jacket, or the like. For example, a coupling mount may be comprised with a support (e.g. to allow for ease of locating a structure with a support). A coupling mount may be comprised with a transition piece (e.g. a transition piece for a support, such as a jacket).

The apparatus may comprise four mounting elements. The mounting elements of the apparatus may be provided as one or more recesses. The mounting element(s) may comprise dampeners, configured for use when mounting the apparatus to one or more coupling mounts. The apparatus may comprise a bump-bar. The bump-bar may be configured to allow for location of the apparatus with respect to a coupling mount.

The apparatus may be comprised with a lifting apparatus, configured to lift an associated structure. The apparatus may be comprised with an associated structure (e.g. initially comprised with an associated structure for subsequent deployment at an offshore site).

The apparatus may comprise a collar. The collar may be configured for association with the clamp. The collar may be associated with the clamp. The collar may be configured to allow for movement (e.g. relative movement) between an associated clamp and the collar. The collar may be configured to allow for retaining of an associated clamp in order to inhibit movement (e.g. relative movement) and to allow for transport of a clamped offshore structure using the collar.

The collar may comprise a recess. The recess may be configured for association with the clamp. The collar may define a recess for association with the clamp. The recess and/or collar may be configured to prevent, or inhibit, removal of the clamp from the collar. The clamp may be configured to inhibit or prevent removal of the clamp from the collar. The clamp may comprise a handling portion, configured to be retained with, or within, the collar (e.g. with or within the recess of the collar).

The apparatus may comprise retaining portions. Each retaining portion may be separable to allow for insertion and clamping of a structure. Each retaining portion may comprise a collar portion and an associated clamp portion. In other words, the collar may be configured as a split collar (e.g. in addition to the clamp being configured as a split ring). The collar portions may be separable to allow for insertion and clamping of a structure.

The apparatus may comprise one or more retainers. The retainer(s) may be configured to inhibit movement (e.g. relative movement) between clamp and collar in order to allow for transport of a clamped structure. The retainer(s) may be provided with the collar. The retainer(s) may be provided with the clamp. The retainer(s) may be provided with the clamp and/or collar. The retainers may be angularly displaced around the collar and/or clamp.

The retainer(s) may comprise a locking actuator. The locking actuator may be configured as a piston. The locking actuator may be configured to extend in order to retain the clamp with the collar.

The apparatus may comprise a plurality of positioning elements. Each positioning element may be configured to position the collar with the clamp. The positioning element(s) may comprise one or more springs, for example one or more: mechanical springs; hydraulic springs; pneumatic springs, etc. The positioning elements may be configured to support the load of the clamp (e.g. the weight of the clamp). The positioning elements may be configured to compress when the collar is held together with the clamp, for example, when using the retainer(s). The positioning elements may be configured with the collar, and/or the clamp.

The apparatus may be configured such that the relative orientation of the collar and clamp is adjustable. The apparatus may be configured to determine the orientation (e.g. relative orientation) of the collar and clamp, for example when using the retainer(s). The apparatus may be configured to use compression of the positioning elements in order to determine the relative orientation of the collar and clamp. For example, when the compression of all positioning elements is the same, or similar, then it may be determined that the clamp/collar are aligned, and/or when the compression of some positioning elements is different, then it may be determined that the clamp/collar are not aligned.

The apparatus may comprise one or more sensors (e.g. optical sensors) in order to determine the relative orientation of the clamp with respect to a structure. The apparatus may comprise one or more sensors (e.g. optical sensors) in order to determine the relative orientation of the collar and clamp. The sensor(s) may be comprised with the positioning elements. The apparatus may be configured to allow for adjusting the relative orientation of the collar and clamp, e.g. when using the retainer(s).

The apparatus may be configured to allow for rotational movement of the clamp, when in use. The rotation movement may allow for a clamped structure to remain upright/vertical, or substantially upright/vertical, during transport, such as lifting and/or restraining (e.g. when a vessel comprising the apparatus/structure is experiencing pitching or rolling).

The apparatus may comprise one or more trunnions. The apparatus may comprise one or more levelling actuators. The actuator(s) may comprise hydraulic actuators.

The apparatus may be configured to allow for lateral movement of the clamp. The apparatus may comprise one or more rails, the rails being usable to allow lateral movement of the clamp. The lateral movement may allow for placement of a structure from a vessel to and/or from an onshore or offshore site.

The apparatus may comprise an orientation assembly. The orientation assembly may be configured to be in communication with the clamp. The assembly may be configured to be in communication with a lifting device. The assembly may comprise a plurality of actuators. The assembly may be configured to allow for opening and closing of a clamp.

The orientation assembly may be configured to allow for relative movement of the collar, and optionally the clamp. The orientation assembly may allow for relative movement of a clamped offshore structure with respect to a lifting device, such a lifting device being in communication with the orientation assembly.

The orientation assembly may allow for one or more of: translation, in one or more axes; pitch; yaw; roll; heave; sway; surge. The orientation assembly may allow for translation in three axes, pitch, yaw, roll, heave, sway and surge.

The orientation assembly may be configured to allow for a clamped structure to remain upright/vertical, or substantially upright/vertical, during transport, such as lifting and/or restraining (e.g. when a vessel comprising the apparatus/structure is experiencing pitching or rolling).

The orientation assembly may be configured to allow for lateral movement of the clamp. The orientation assembly may be configured to be in communication with one or more rails, the rails being usable to allow lateral movement of the clamp. The orientation assembly may be in communication with a sliding table to allow lateral movement of the clamp. The lateral movement may allow for placement of a structure from a vessel to and/or from an onshore or offshore site. The lateral movement may allow coarse adjustment of a clamped structure.

The assembly may comprise six actuators. The actuators may be in communication with a lifting device via a sliding table. The actuators may be in communication with a clamp via the collar. The actuators may be rotationally attached to a sliding table and/or collar.

The actuators may be attached to collar portions of the apparatus. The collar portions may be separable in order to allow for insertion of a structure. In other words, the assembly may be configured to open and close the collar portions in order to allow for insertion of a structure. The actuators may be attached to the apparatus at interface regions of collar portions (e.g. the regions when one collar portion is configured to meet (e.g. radially meet), with a further collar portion). Some of the interface regions may be pivotally connected, such as being hingedly connected. Some of the collar portions may be hingedly connected.

The orientation assembly may resemble a hexapod, or Stewart platform. The orientation assembly may comprise a hexapod, or Stewart platform. The orientation assembly may be configured as a hexapod, or Stewart platform.

The apparatus may comprise a plurality of retaining portions. Each retaining portion may comprise a collar portion and associated clamp portion. The retaining portions may be separable in order to allow for insertion of a structure. In other words, the apparatus may be configured to open and close the retaining portions in order to allow for insertion of a structure. The apparatus may comprise three retaining portions. Each retaining portion may be configured for use with roughly 120 degrees of a structure. The apparatus may be configured for use in radially clamping an offshore structure. The apparatus may be configured as a split ring.

The orientation assembly may be configured to allow for opening and closing of the retaining portions. The assembly may be in communication with a lifting device (e.g. a crane boom). The apparatus may be comprised with a lifting device.

The actuators may be in communication with a lifting device via a sliding table. The actuators may be in communication with a clamp using the collar. The actuators may be rotationally attached to a sliding table and/or collar. The actuators may be attached to the apparatus at interface regions of retaining portions.

According to a third aspect of the invention there is provided an offshore structure for an offshore site.

The structure may comprise a transport element. The transport element may be configured for complementary mating with an engagement element. The engagement element may be of a clamp and configured to allow for transport of the structure using a clamp.

Transport of the structure may include lifting and/or restraining of the structure.

The structure may comprise any features of the first aspect.

According to a fourth aspect of the invention there is provided apparatus for allowing for transport of an offshore structure.

The apparatus may comprise a clamp. The clamp may have an engagement element configured for complementary mating with a transport element of a structure to allow for transport of a structure.

Transport of the structure may include lifting and/or restraining of the structure.

The apparatus may comprise any features of the third aspect.

According to a fifth aspect of the invention there is provided apparatus for transport of an offshore structure, the apparatus comprising a clamp configured to allow for lifting and/or restraining of an offshore structure, wherein the apparatus comprises one or more levelling actuators, the actuators configured to provide for rotation movement of a clamped structure in order to correct for pitch and/or roll.

The pitch/roll may be of the apparatus, or a vessel comprising the apparatus. The levelling actuators may be configured to maintain a clamped structure in an upright, or substantially upright, orientation.

The apparatus may comprise one or more trunnions. The clamp may comprise an engagement element, for complementary mating with a transport element of a structure.

The apparatus may be configured to allow for gimballing.

The apparatus may comprise an orientation assembly. The orientation assembly may comprise the one or more actuators. The orientation assembly may be configured to be in communication with the clamp (e.g. communication with the clamp via a collar). The assembly may be configured to be in communication with a lifting device (e.g. via sliding table). The assembly may comprise a plurality of actuators. The assembly may be configured to allow for opening and closing of a clamp.

The orientation assembly may be configured to allow for relative movement of the clamp. The orientation assembly may allow for relative movement of a clamped offshore structure with respect to a lifting device, such a lifting device being in communication with the orientation assembly.

The orientation assembly may allow for one or more of: translation, in one or more axis; pitch; yaw; roll; heave; sway; surge. The orientation assembly may allow for translation in three axes, pitch, yaw, roll, heave, sway and surge.

The assembly may comprise six actuators. The orientation assembly may resemble a hexapod, or Stewart platform. The orientation assembly may comprise a hexapod, or Stewart platform. The orientation assembly may be configured as a hexapod, or Stewart platform.

The actuators may be attached to retaining portions of the apparatus. The retaining portions may be separable in order to allow for insertion of a structure. In other words, the assembly may be configured to open and close the retaining portions in order to allow for insertion of a structure. The actuators may be attached to the apparatus at interface regions of retaining portions (e.g. the regions when one collar portion is configured to meet (e.g. radially meet), with a further collar portion). Some of the interface regions may be hingedly, or pivotally, connected. Some of the retaining portions may be hingedly connected.

According to a sixth aspect, there is provided apparatus comprising a collar configured for association with a clamp used to clamp an offshore structure, wherein the collar is configured to allow for relative movement between an associated clamp and the collar, and is further configured to allow for retaining of an associated clamp in order to inhibit such movement and to allow for transport of a clamped offshore structure using the collar.

The collar may comprise a recess for associating with a clamp. The collar may define a recess for associating with a clamp. The recess and/or collar may be configured to prevent, or inhibit, removal of a clamp from the collar.

The apparatus may comprise a clamp, associated with the collar. The clamp may be configured to inhibit or prevent removal of the clamp from the collar. The clamp may comprise a retaining portion, configured to be retained with, or within, the collar (e.g. the recess of the collar).

The clamp may comprise any features of the clamp of the second, fourth or fifth aspects (e.g. the clamp may comprise an engagement element for complementary mating with a transport element of a structure to allow for transport of a structure).

The apparatus may comprise one or more retainers configured to inhibit relative movement between clamp and collar in order to allow for transportation of a clamped structure. The retainer(s) may be provided with the collar. The retainer(s) may be provided with the clamp. The retainer(s) may be provided with the clamp and/or collar.

The retainer(s) may comprise a locking actuator. The locking actuator may be configured as a piston. The locking actuator may be configured to extend in order to retain the clamp with the collar.

The apparatus may comprise a plurality of positioning elements. Each positioning element may be configured to position the collar with the clamp. The positioning element(s) may comprise one or more springs, for example one or more: mechanical springs; hydraulic springs; pneumatic springs, etc. The positioning elements may be configured to support the load of the clamp (e.g. the weight of the clamp). The positioning elements may be configured to compress when the collar is held together with the clamp using the retainer(s). The positioning elements may be configured with the collar, and/or the clamp.

The apparatus may be configured such that the relative orientation of the collar and clamp can be adjusted. The apparatus may be configured to determine the relative orientation of the collar and clamp, e.g. when using the retainer(s). The apparatus may be configured to use the compression of the positioning elements in order to determine the relative orientation of the collar and clamp. The apparatus may comprise one or more sensors (e.g. optical sensors) in order to determine the relative orientation of the collar and clamp. The sensor may be comprised with the positioning elements.

The apparatus may be configured to allow for adjusting the relative orientation of the collar and clamp when using the retainer(s). The apparatus may be in communication an orientation assembly configured to allow for relative orientation of the collar. The orientation assembly comprising one or more actuators configured to allow for relative orientation of the collar (and clamp).

The apparatus may comprise the orientation assembly. The orientation assembly may further allow for relative movement of a clamped offshore structure with respect to a lifting device, the lifting device being in communication with the orientation assembly.

The orientation assembly may be configured to allow for rotational movement of the clamp, when in use. The rotation movement may allow for a clamped structure to remain upright/vertical, or substantially upright/vertical, during transport, such as lifting and/or restraining (e.g. when a vessel comprising the apparatus/structure is experiencing pitching, rolling, yawing, heaving, swaying, surging).

The orientation assembly may be configured to allow for lateral movement of the clamp. The orientation assembly may comprise one or more rails, the rails being usable to allow lateral movement of the clamp. The lateral movement may allow for placement of a structure from a vessel to and/or from an onshore or offshore site.

The orientation assembly may resemble, comprise or be configured as a hexapod, or Stewart platform.

The apparatus may comprise a plurality of retaining portions. The retaining portions may be separable in order to allow for insertion of a structure. In other words, the apparatus may be configured to open and close the retaining portions in order to allow for insertion of a structure. Each retaining portion may comprise an associated collar portion and clamp portion.

The orientation assembly may be configured to allow for opening and closing of the retaining portions. The assembly may be in communication with a lifting device (e.g. a crane boom). The apparatus may be comprised with a lifting device.

The apparatus may be configured for use in radially clamping an offshore structure. The apparatus may be configured as a split ring. The apparatus may comprise three retaining portions. Each retaining portion may be configured for use with roughly 120 degrees of a structure.

According to seventh aspect of the invention, there is provided an orientation assembly for allowing for transport of an offshore structure, the assembly configured to be in communication with a clamp for clamping an offshore structure, the assembly further configured to be in communication with a lifting device, wherein the assembly comprises a plurality of actuators configured to allow for opening and closing of a clamp as well as for relative movement of a clamped offshore structure with respect to a lifting device.

The assembly may comprise six actuators. The orientation assembly may resemble a hexapod, or Stewart platform. The orientation assembly may comprise a hexapod, or Stewart platform. The orientation assembly may be configured as a hexapod, or Stewart platform.

The actuators may be in communication with a lifting device via a sliding table. The actuators may be in communication with a clamp using a retaining apparatus comprising a collar. The actuators may be rotationally attached to a sliding table and/or retaining apparatus.

The actuators may be attached to retaining portions of the apparatus. The retaining portions may be separable in order to allow for insertion of a structure. In other words, the assembly may be configured to open and close the retaining portions in order to allow for insertion of a structure. The actuators may be attached to the retaining apparatus at interface region of retaining portions. Some of the interface regions may be hingedly connected.

According to an eighth aspect of the invention there is provided an offshore system, the system comprising a structure according to any of the features of the first or third, aspects and/or comprising apparatus according to any of the features of the second, fourth, fifth, sixth or seventh aspects.

According to a ninth aspect of the invention there is provided an offshore site comprising one or more structures according to any of the features of the first or third aspects.

The offshore site may be a wind farm.

According a tenth aspect of the invention there is provided an onshore site, such as a construction or assembly site, comprising apparatus according to any of the features of the second, fourth, fifth, sixth or seventh aspects.

According to an eleventh aspect of the invention there is provided an onshore site, such a construction or assembly site, comprising one or more structures according to any of the features of the first or third aspects According to a twelfth aspect of the invention there is provided a vessel, such as a barge, or heavy lifting vehicle, comprising one or more structures according to any of the features of the first or third aspects and/or comprising apparatus according to any of the features of the second, fourth fifth, sixth or seventh aspects.

The vessel may be an installation vessel. The vessel may be a maintenance vessel. The vessel may be a barge.

According to a thirteenth aspect of the invention there is a clamp for allowing for transport of a wind turbine structure, the clamp comprising an engagement element configured for complementary mating with a transport element of a structure to allow for transport of a structure.

According to a fourteenth aspect of the invention there is an interface portion for attaching of a wind turbine tower to a support, the interface portion comprising a transport element configured for complementary mating with an engagement element of a clamp and configured to allow for transport of a tower and/or support using a clamp.

According to a fifteenth aspect of the invention there is an interface portion for an offshore structure, the interface portion configured to attach a first section of an offshore structure to a second section of an offshore structure, the interface portion comprising a transport element configured for complementary mating with an engagement element of a clamp and configured to allow for transport of a first and/or second section using a clamp.

According to a sixteenth aspect of the invention there is provide a method for transporting an offshore structure, the method comprising:
providing an offshore structure for an offshore site, the structure comprising a transport element; and
clamping the structure using an engagement element having complementary mating with the transport element.

Transport of the structure may include lifting of the structure, such as lifting at an onshore and/or offshore site. Transport of the structure may include providing for installing of the structure at an offshore site. Transport of the structure may include restraining of the structure during transport to or from an offshore site. Transport of the structure may include lifting and restraining of the structure.

The structure may be a wind turbine structure. The method may be for lifting the structure. The method may be for restraining the structure (e.g. during transport to/from an offshore site).

The method may comprise releasing or removing the engagement element and/or clamp after transport.

According to a seventeenth aspect of the invention there is provide a method for providing for installing an offshore structure, the method comprising:
providing an offshore structure for an offshore site, the structure comprising a transport element;
clamping the structure using an engagement element having complementary mating with transport element; and
transporting the structure to an offshore site.

According to a eighteenth aspect there is provide a method for providing for maintenance of an offshore structure, the method comprising:
providing an offshore structure for an offshore site, the structure comprising a transport element;
clamping the structure using an engagement element having complementary mating with transport element; and
allowing for transporting the structure from an offshore site to allow for maintenance of the structure.

According to a nineteenth aspect of the invention there is provided a method of installing an offshore structure, such as a wind turbine structure, the method comprising:
providing a tower;
providing a support;
connecting the tower and the support so as to provide an offshore structure; and
subsequently positioning the offshore structure at an offshore location.

The support may be a jacket. The offshore location may in water deeper than 30 m. The offshore location may be in water between 30 m and 45 m deep. The offshore location may be in water deeper than 45 m.

The method may include providing a turbine, such as a wind turbine. The method may include connecting the turbine to the tower so as to provide the offshore structure. The method may include connecting the turbine to the tower prior to positioning the structure at the offshore location.

Connecting the tower to the support and/or connecting the turbine to the tower may be carried out onshore.

Between the step of connecting the tower and the support, (and the optional step of connecting the turbine to the support) and the subsequent step of positioning the offshore structure at offshore site, the method may comprise the step of transporting the offshore structure, e.g. from an onshore site, such as construction, fabrication, or assembly site/yard to the offshore location.

Subsequent to positioning the offshore structure at the offshore location, the method may comprise disconnecting the tower from the support. This may provide for maintenance, repair and/or replacement of the tower and/or for the turbine.

Alternatively, or additionally, subsequent to positioning the offshore structure at the offshore location the method may comprise disconnecting the turbine or part thereof from the tower. This may provide for maintenance and/or repair and/or replacement of the turbine or part thereof.

When positioning the offshore structure at an offshore location, the tower may be above, or substantially above, the body of water. The support may be below, or substantially below, the body of water.

According to a twentieth aspect of the invention, there is provided a vessel, such as a ship, boat, or barge having or carrying at least one offshore structure, such as a wind turbine structure, comprising a tower and a support connected thereto.

The support may be a jacket. The offshore structure may comprise a turbine such as a wind turbine attached to the tower. The wind turbine may comprise a plurality of blades and/or a nacelle.

The vessel may be for use at an offshore location, which may in water deeper than 30 m. The offshore location may be in water between 30 m and 45 m deep. The offshore location may be in water deeper than 45 m.

According to a twenty-first aspect of the invention there is provided a method comprising:
 associating a collar with a clamp, the clamp usable to clamp an offshore structure and the collar configured to allow for relative movement of the clamp and collar;
 clamping an offshore structure using the clamp; and
 subsequently retaining the clamp in order to inhibit relative movement between the clamp and the collar and to allow for transport of a clamped offshore structure using the collar.

The method may comprise associating the clamp with a recess of the collar. Associating the collar with the clamp may be provided by providing apparatus having the collar pre-existingly associated with the clamp.

The method may comprise associating a handling portion of the clamp with the collar. The handling portion may be configured to inhibit or prevent removal of the clamp from the collar (e.g. configured to be retained with, or within, the collar (e.g. the recess of the collar)).

Transport of a structure may include lifting of a structure, such as lifting at an onshore and/or offshore site. Transport of a structure may include providing for installing of a structure at an offshore site. Transport of the structure may include restraining of a structure during transport to or from an offshore site. Transport of a structure may include lifting and/or restraining of a structure.

The method may comprise determining the relative orientation of the clamp and collar. The method may comprise determining the state of one or more positioning elements configured to be in communication with the collar or clamp in order to determine the orientation of the clamp/collar.

The method may comprise adjusting the relative orientation of the clamp and collar, e.g. by adjusting the orientation of the collar after the clamp has been clamped to a structure. The method adjusting the relative orientation of the collar so as to be aligned with the clamp, which may be after the clamp has clamped a structure.

The method may comprise transporting a structure.

According to a twenty-second aspect of the invention, there is provided a method comprising:
 using one or more actuators to allow for a clamp to open and close so as to clamp an offshore structure;
 using the actuator(s) to provide relative movement of a clamped offshore structure with respect to a lifting device.

The relative movement may be provided when the clamped structure is being transported.

According to a twenty-third aspect of the invention there is provided an offshore assembly for an offshore site, the assembly comprising a transportation flange configured for complementary mating with a mating coupler of a clamping device and configured to allow for transport of the structure using a clamping device.

The assembly may be a wind turbine assembly. Transport of the structure may include lifting and/or restraining of the structure.

According to a twenty-fourth aspect of the invention there is provided apparatus for allowing for transport of an offshore structure, the apparatus comprising a clamping device having a mating coupler configured for complementary mating with a transportation flange of a structure to allow for transport of a structure.

The assembly may be a wind turbine assembly. Transport of the structure may include lifting and/or restraining of the structure.

According to a twenty-fifth aspect of the invention there is provided a means for generating power from wind for an offshore site, the means for generating comprising a means for transportation configured for complementary mating with a means for engaging of means for clamping, the means for transportation configured to allow for transport of the means for generating using a means for clamping.

According to a twenty-sixth aspect of the invention there is provided means for allowing for transport of a means for generating power from wind, the means for allowing for transport comprising a means for clamping having a means for engaging, the means for engaging configured for complementary mating with a means for transporting of a means for generating to allow for transport of a means for generating.

According to a twenty-seventh aspect of the invention, there is provided means for allowing for transport of a means for a structure, the means for allowing for transport comprising a meanings for retaining configured for association with a means for clamping, the wherein the means for retaining is configured to allow for relative movement between an associated means for clamping and the means for retaining, and is further configured to allow for retaining of an associated means for clamping in order to inhibit such movement and to allow for transport of a clamped means for a structure using the means for retaining.

According to a twenty-eighth aspect of the invention there is provided a means for orientating for allowing for transport of a means for a structure, the means for orientating configured to be in communication with a means for claiming for an means for a structure, the means for orientating further configured to be in communication with a means for lifting, wherein the means for orientating comprises a plurality of means for actuating configured to allow for opening and closing of a means for clamping as well as for relative movement of a clamped means for a structure with respect to a means for lifting.

According to a twenty-ninth aspect of the invention there is provided a wind power generation assembly for a wind farming site, the assembly comprising a transportation portion configured for complementary attachment to an coupling portion of a retaining device and configured to allow for transport of the assembly using a retaining device, wherein the transportation portion is provided at a coupling region between a supporting jacket and an upper section of the assembly, the upper section configured to support a wind turbine.

According to a thirtieth aspect of the invention there is provided transportation apparatus for a wind power generation assembly, the apparatus comprising a retaining device having a coupling portion configured for complementary mating with a transportation portion of a structure to allow for transport of an assembly, wherein the retaining device is configured for coupling with a transportation portion provided at a coupling region between a supporting jacket and an upper section of an assembly, such an upper section configured to support a wind turbine.

According to a thirty-first aspect of the invention, there is apparatus for lifting of a structure, such as an offshore structure.

The apparatus may comprise a restraining region. The restraining region may be configured to restrain a structure so as to associate the apparatus with a structure and mitigate movement of an associated structure with respect to the apparatus.

The apparatus may comprise a lifting region configured to allow for lifting of an associated structure. The apparatus may be configured so as to modify an effective centre of gravity of an associated structure, from that of an un-associated structure, in order to allow for ease of lifting.

Additionally, or alternatively, the apparatus may be configured so as to modify an effective centre of inertia of an associated structure, from that of an un-associated structure, in order to allow for ease of lifting.

The restraining region may be considered to be a connecting region (e.g. usable to connect the apparatus to a structure).

The apparatus may be configured to modify the effective centre of gravity and/or inertia of an associated structure by lowering the effective centre of gravity, and/or inertia. The apparatus may be configured to modify the effective centre of gravity and/or inertia to be roughly at the lifting region. The apparatus may be configured to modify the effective centre of gravity and/or inertia to be roughly at a lifting point of the lifting region. The lifting point may be associated with the location at which the apparatus is configured for communication (e.g. attachment) with lifting apparatus (e.g. a hoist, crane, or the like).

The apparatus may be configured to lower the effective centre of gravity and/or inertia below, or further below, the lifting region or lifting point, when the apparatus is associated with a structure. The apparatus may be configured such that the effective centre of gravity and/or the lifting region is above the restraining region, when a structure is associated, and oriented for lifting.

The apparatus associated with a structure may be considered an assembly. A centre of gravity and/or inertia of the assembly may be lower than that of a structure, per se.

The apparatus may comprise one or more ballasts. The ballast(s) may be configured to allow for modifying, or additionally modifying, the effective centre of gravity and/or inertia of an associated structure. The ballast(s) may allow for variable ballast to be added to and/or removed from the apparatus. The ballast(s) may be configured to store water, such as sea water. The ballast(s) may be comprised within the apparatus. The ballast(s) may be provided externally to the apparatus.

The apparatus may be configured for association with an attachment region of a structure or support (e.g. a region for attaching a structure to a support, such as a jacket or transition piece, or the like). The restraining region may be configured for association with an attachment region of a structure or support (e.g. a region for attaching the structure to a support, such as a jacket or transition piece, or the like).

Such an attachment region may be the location at which a structure attaches to a support (e.g. the region at which a wind turbine tower attaches to a jacket or transition piece).

The apparatus may be configured to extend along a structure, when associated (e.g. partially, substantially or fully along). The apparatus may be configured to surround, substantially, partially or fully around a structure, when associated. The apparatus may be essentially constructed as a frame. The apparatus may comprise main struts (e.g. four main struts), which are connected (e.g. connected on three sides) to define an exterior to the apparatus. One side of the apparatus (e.g. between particular main struts) may allow for insertion and removal of a structure. This maybe considered to be a gated side. The apparatus may be provided with a gate, which may be usable to open and close to allow insertion/removal/retention of a structure.

The restraining region may comprise a clamp. The clamp may be configured to associate with a structure in order to restrain that structure. The clamp may be configured to engage with a structure, such as engage with a transport element of a structure.

The clamp may be configured to engage with one or more protrusions, or recesses, of a structure. The clamp may be configured to mate, such as mate in a complementary manner, with a structure (e.g. with a transport element of a structure).

The clamp may comprise two or more clamp portions. The clamp portions may be separable in order to allow for insertion and/or removal of a structure. The two or more clamp portions may be configured as a split clamp. The clamp may be configured to surround, or mostly surround an associated structure. The clamp (e.g. clamp portions) may be opened and/or closed using one or more pistons. Each clamp portion may be associated with one or more pistons. The clamp portions may be configured to open/close radially. The clamp may comprise three clamp portions.

The clamp may comprise an engagement element, configured to engage with a transport element of a structure. The engagement element may be configured to extend around some of, or all of, the clamp. The engagement element may be annular. The engagement element may comprise a recess, or groove. The engagement element may be configured with a plurality of protrusions and/or recesses.

The engagement element may comprise one or more tapered portions. The tapered portion(s) may be radially tapered. The engagement element may be configured to provide for mating with a transport element of a structure. The engagement element may be configured such that the one or more tapered portions provide for mating with one or more complementary tapered portions of a transport element. The mating may be interference mating. First and second tapered portions may be provided so as to face away from one another. First and second complementary tapered portions may face one another.

The apparatus may be configured for use with a structure comprising a tower. Such a tower may be for supporting a wind turbine, nacelle, etc. The clamp may be configured to extend along a portion of the structure, when in use. The clamp may be configured to increase the rigidity of a structure, when in use.

The engagement element may be configured for use with a transport element comprised with a tower of a structure. Such a tower may be configured to attach to a support, such as a transition piece, jacket, tripod, gravity base, monopile, or the like. The engagement element may be configured for mating with a transport element of an attachment region of a tower. Such an attachment region may be configured to attach to a support. The engagement element may be configured for mating with a flange used for attachment of a tower and a support of a structure.

The engagement element may be configured for mating with an interface portion of a structure. Such an interface portion may be configured to allow for attachment between structure and support (e.g. between a tower and a support). Such an interface portion may be configured to be positioned between a tower and a support. The engagement element may be configured for mating with a flange used for attachment of a tower and a support.

The apparatus may be configured for mounting with a coupling mount. The apparatus may comprise one or more mounting elements configured to allow the apparatus to mount with a coupling mount. The one or more mounting elements of the apparatus may be configured for associating (e.g. complementary mating) with mounting elements of a coupling mount.

Such a coupling mount may be configured for use onshore, and/or configured for use during transit (e.g. when transporting a structure to an offshore site). Such a coupling mount may be configured for use on the desk of a vessel.

Such a coupling mount may be configured for use with a support, such as a jacket, or the like. For example, a coupling mount may be comprised with a support (e.g. to allow for ease of locating a structure with a support). A coupling mount may be comprised with a transition piece (e.g. a transition piece for a support, such as a jacket).

The apparatus may comprise four mounting elements. The mounting elements of the apparatus may be provided as one or more recesses. The mounting element(s) may comprise dampeners, configured for use when mounting the apparatus to one or more coupling mounts. The apparatus may comprise a bump-bar. The bump-bar may be configured to allow for location of the apparatus with respect to a coupling mount.

The apparatus may be comprised with a lifting apparatus, configured to lift an associated structure. The apparatus may be comprised with an associated structure (e.g. initially comprised with an associated structure for subsequent deployment at an offshore site).

According to a thirty-second aspect of the invention there is provided a coupling mount for use with a structure, such as an offshore structure, the coupling mount comprising one or more mounting elements configured for mounting with apparatus for lifting of an offshore structure.

The mounting elements may be configured for locating of an apparatus with respect to the coupling mount. The mounting elements may be of differing sizes to allow for locating of an apparatus with the support.

The one or more mounting elements of the coupling mount may be configured for associating (e.g. complementary mating) with mounting elements of an apparatus for lifting. The coupling mount may be configured for use onshore, and/or configured for use during transit (e.g. when transporting a structure to an offshore site). The coupling mount may be configured for use on the desk of a vessel.

The coupling mount may be configured for use with a support. The coupling mount may be comprised with a support (e.g. to allow for ease of locating a structure with a support). The coupling mount may be comprised with a transition piece (e.g. a transition piece for a jacket). The coupling mount may be comprised with a jacket. The coupling mount may be comprised with a vessel.

The coupling mount may comprise a plurality of mounting elements (e.g. four mounting elements). The mounting elements may be of differing heights in order to allow for ease of location of an apparatus with the coupling mount. The mounting elements of the coupling mount may be provided as recesses, or protrusions (e.g. one or more stabbing posts). The mounting element(s) may comprise dampeners, configured for use when mounting to an apparatus. The coupling mount may be configured for use with a bump-bar. Such a bump-bar may be for locating of apparatus with respect to the coupling mount.

According to a thirty-third aspect of the invention there is provided an offshore assembly comprising a support and a coupling mount comprising one or more mounting elements configured for mounting with apparatus for lifting of an offshore structure.

The coupling mount may be comprised with the support. The coupling mount may be comprised with a transition piece of the support. The support may be a jacket, which may be three-legged, four-legged, or the like. The number of mounting elements may be commensurate with the number of legs of the jacket (e.g. the same number).

According to a thirty-fourth aspect of the invention there is provided a vessel comprising one or more coupling mounts, the or each coupling mount comprising one or more mounting elements configured for mounting with apparatus for lifting of an offshore structure.

The vessel may comprise one or more apparatus associated with the coupling mounts. The apparatus may be associated with offshore structures, such as wind turbine structures.

According to a thirty-fifth aspect of the invention there is provided apparatus for lifting of a structure, such as an offshore structure, the apparatus comprising:
  a restraining region configured to restrain a structure so as to associate the apparatus with a structure and mitigate movement of an associated structure with respect to the apparatus, and
  a lifting region configured to allow for lifting of an associated structure, wherein
  the apparatus further comprising one or more mounting elements configured to allow the apparatus to mount with a coupling mount.

According to a thirty-sixth aspect of the invention there is provided apparatus for lifting of a structure, such as an offshore structure, the apparatus comprising:
  a restraining region configured to restrain a structure so as to associate the apparatus with a structure and mitigate movement of an associated structure with respect to the apparatus, and
  a lifting region configured to allow for lifting of an associated structure, wherein
  the apparatus is configured to surround, or substantially surround, an associated structure.

According to a thirty-seventh aspect of the invention there is provided wind turbine structure lifting apparatus, the apparatus comprising:
  a restraining region configured to restrain a wind turbine structure so as to associate the apparatus with a structure and mitigate movement of an associated structure with respect to the apparatus, and
  a lifting region configured to allow for lifting of an associated structure.

According to a thirty-eighth aspect of the invention there is provided means for transporting a means for an offshore structure, the means for transporting comprising:
  a means for restraining configured to restrain a means for an offshore structure so as to associate the means for lifting with a means for an offshore structure and mitigate movement of an associated means for an offshore structure with respect to the means for lifting, and a means for lifting configured to allow for lifting of an associated means for an offshore structure, wherein the means for transporting is configured so as to modify an effective centre of gravity of an associated means for an offshore structure, from that of un-associated means for an offshore structure, in order to allow for ease of lifting.

According to a thirty-ninth aspect of the invention, there is provided a method of transporting a structure, such as an offshore structure, comprising:

using apparatus to restrain a structure so as to associate the structure with the apparatus and modify an effective centre of gravity of an associated structure, from that of an un-associated structure, in order to allow for ease of lifting.

According to a fortieth aspect of the invention there is provided a method of allowing for transporting an offshore structure comprising constructing a structure, such as an offshore structure, within apparatus for lifting the structure, and associating the structure with the apparatus at a restraining region in order to allow for transportation.

The restraining region may be associated with an attachment region of the structure.

According to a forty-first aspect of the invention there is provided apparatus for lifting of a structure, such as an offshore structure, the apparatus comprising:

a restraining region configured to restrain a structure so as to associate the apparatus with a structure and mitigate movement of an associated structure with respect to the apparatus, and a lifting region configured to allow for lifting of an associated structure.

According to a forty-second aspect of the invention there is provided apparatus for lifting of a structure, such as an offshore structure. The apparatus may comprise a restraining region. The restraining region may be configured to restrain a structure so as to associate the apparatus with a structure and mitigate movement of an associated structure with respect to the apparatus. The apparatus may comprise a lifting region configured to allow for lifting of an associated structure. A restrained structure and apparatus may be considered to be an assembly. The centre of gravity of the assembly may be lower than that of the structure, per se.

According to a forty-third aspect of the invention, there is apparatus for lifting of a structure, such as an offshore structure. The apparatus may comprise a restraining region. The restraining region may be configured to restrain a structure so as to associate the apparatus with a structure and mitigate movement of an associated structure with respect to the apparatus. The apparatus may comprise a lifting region configured to allow for lifting of an associated structure. The apparatus may be configured so as to modify an effective centre of inertia of an associated structure, from that of an un-associated structure, in order to allow for ease of lifting.

According to a forty-fourth aspect of the invention there is provided an onshore site, such as a construction or assembly site, comprising apparatus according to any of the features of the thirty-first or thirty-second aspects.

According to a forty-fourth aspect of the invention there is provided a vessel, such as a marine vessel, barge, ship or boat, or a vehicle, such as a heavy lifting vehicle, comprising one or more structures according to any of the features of the first or third aspects and/or comprising apparatus according to any of the features of the thirty-first or thirty-second aspects.

The vessel may be an installation vessel. The vessel may be a maintenance vessel. The vessel may be a barge.

According to a further aspect of the invention, there is provided a crane or hoist, such as a hoisting crane. The crane may be a marine and/or offshore crane.

The crane may comprise a hoisting boom, which may have a lifting region configured to lift a load. The crane may additionally comprise an actuatable restraint device. The device may extend from the crane (e.g. from a body of the crane). The device may be configured to engage with a load being lifted, so as to control movement of that load with respect to the lifting region.

The device may be configured to control movement in as much as inhibiting, or mitigating, certain movement.

The device may be configured to inhibit rotational pivoting movement (e.g. swinging) of a load about, or with respect to, the lifting region, in at least one direction. The device may be configured to inhibit rotational movement about that pivot in more than one direction, when coupled with a load. Inhibiting such rotational, pivoting or swinging movement may be considered to be inhibiting horizontal movement of a load with respect to the crane in at least one direction.

In addition, or alternatively, the device may be configured to control rotational movement of a body axis of the load with respect to the lifting region. In some embodiments, the device may be configured to maintain a fixed orientation of the body axis of a load with respect to the lifting region, i.e. not significantly permit a load to twist with respect to the lifting region. In other examples, the device may be configured to control the movement of a load so as to twist and orientate a load, with respect to the lifting region.

The device may be configured to control movement of a load in more than one direction, such as in two directions, or in all directions.

The device may be configured to allow a load to translate with respect to the device when being lifted and/or lowered. In other words, the device may be configured to allow a load to move vertically with respect the lifting region (e.g. even when other movement, such as twisting and/or swinging rotation, is being inhibited).

The device may comprise one or more actuatable couplings. The coupling may be considered to be configured as forks, or the like. The, or each, coupling may be configured to couple, or mount with, a load, so as to inhibit movement in at least one direction. The coupling may be adjustable so as to modify the coupling, or mounting, of the device, with respect to a load, during the lifting and/or lowering, so as to permit relative vertical movement of a load, but at the same time inhibiting other movement.

The couplings may be specifically configured to abut, or the like, a particular load so as to inhibit movement. The couplings may be configured to abut a frame, such as that of the lifting apparatus of the above embodiments, or a jacket, or the like.

The restrain device may comprise one or more restraining members. The restraining members may be configured to restrain a load against the device (e.g. against the couplings). The restraining member may comprise lashings, cablings, or the like. The restraining member may be configured to inhibit movement, such as sliding movement, of a load in at least one direction relative to the couplings. The restraining members may be configured to attach between a load and the couplings in order to inhibit movement of the load (e.g. particularly in poor weather conditions).

The device may comprise one or more extendable arms, which extend from a crane body. The device may comprise at least one pair of arms. The arms may be arranged, e.g. arranged symmetrically, on either side of the crane body. The arms may comprise the couplings. The arms may be actuatable so as to extend and/or retract from the crane so as to mount or couple with a load.

The crane may be configured such that the device and the boom move, such as rotate, together, for example, to allow a load to be moved to/from a deck of a ship. The boom and the device may be considered to be in a fixed rotational relationship with one another, for example, to allow the crane to rotate and move a load to/from a ship.

Alternatively, the crane may be configured such that the device and boom can move, such as rotate, independently of each other (e.g. can be controlled independently). For example, the device and the boom may be configured to allow the device to be slewed independently with respect to the boom. Relative movement of the device with respect to the boom may allow for an angling or adjustment of the load. In similar words, in certain embodiments the independent rotational relationship between the boom and the device may be used to obtain an improved alignment of the device/load with respect to the boom.

In some examples, the device may be removable from the crane (e.g. for maintenance or repair, or the like). In some examples, the device may be retrofit to the crane.

In some examples, the crane may be configured to lift an offshore structure, such as a wind turbine structure, or components thereof.

According to a further aspect of the invention there is provided a hoisting crane comprising:
  a hoisting boom having a lifting region, configured to lift a load; and
  an actuatable restraint device, the device extending from the crane, and configured to engage with a load being lifted, so as to control movement of that load with respect to the lifting region in at least one direction.

According to a further aspect of the invention there is provided a method of lifting a load, comprising
  coupling a load to a lifting region of a boom of crane, and engaging the load with an actuatable restraint device, the device extending from the crane, and engaging with the load so as to control movement of that load the with respect to the lifting region in at least one direction.

The method may further include rotating the crane for transporting and positioning a load onto a vessel.

Alternatively, or additionally, the method may include lifting of an offshore structure or components thereof and subsequently positioning of the offshore structure at an offshore site.

Alternatively, the method may further comprise a step of transporting an offshore structure to an onshore site, such as construction, fabrication or assembly site for repair or maintenance of the offshore structure.

Alternatively, or additionally, the method may comprise a step of independently rotating the device with respect to the boom so as to improve the alignment of the device or load with respect to the boom.

According to a further aspect of the invention, there is provided a vessel, such as a marine vessel, barge, ship or boat, or a vehicle, such as a heavy lifting vehicle, comprising one or more cranes according to the above aspects.

According to a further aspect of the invention, there is provided an offshore structure, such as a wind turbine structure or components thereof (e.g. a jacket or frame of a jacket), lifted and/or positioned on a vessel, at an offshore site or at an onshore site by a crane according to the above aspects.

The above summary is intended to be merely exemplary and non-limiting. The invention includes one or more corresponding aspects, embodiments or features in isolation or in various combinations whether or not specifically stated (including claimed) in that combination or in isolation. For example, any features of the thirsty-first aspect may equally be features of thirty-fifth, thirty-sixth, etc. aspects, without the need to unnecessarily and list those various embodiments or features.

It will be appreciated that one or more embodiments/aspects may be useful when transporting structures to or from offshore site(s), which may include installing wind turbine structures at an offshore site. Corresponding means for performing one or more of the discussed functions are also within the present disclosure.

BRIEF DESCRIPTION OF THE FIGURES

A description is now given, by way of example only, with reference to the accompanying drawings, which are:—

FIG. 2 shows a cross-section of a portion of an attachment region of a similar structure of FIG. 1, showing a transport element and clamp;

FIGS. 3a and 3b, show cross-sections of an alternative attachment region;

FIGS. 4a, 4b and 4c show examples of an interface portion, comprising a transport element;

FIG. 5 shows an example of apparatus comprising a clamp in use with a structure;

FIG. 6 shows an example of apparatus with a lifting device;

FIG. 7 shows an example of apparatus for gimballing;

FIGS. 9a to 9c shows an example of apparatus comprising a collar, shown clamping a structure;

FIGS. 10 and 11 show examples apparatus comprising an orientation assembly, configured to allow for orientating a clamped structure;

FIG. 12 shows apparatus of FIGS. 9, 10 and 11 in use;

FIG. 13 shows apparatus of FIGS. 9, 10 and 11 in use with a vessel;

FIG. 15a shows a lifting region of the apparatus of FIG. 14; and FIG. 15b shows a restraining region of the apparatus of FIG. 14;

FIG. 16 shows mounting elements of the apparatus of FIGS. 14 and 15;

FIG. 17a shows an exemplary coupling mount, provided as a transition piece, for use with the mounting elements of FIG. 16; and FIGS. 17b and 17c shows an exemplary coupling mount comprised with a support;

FIGS. 18a to 18e shows apparatus for use with structures;

FIG. 19a shows a perspective view of a hoisting crane comprised with apparatus similar to that of FIG. 14;

FIGS. 19b and 19c show front and side view of the crane of FIG. 19a;

FIG. 20a shows use of the crane with an exemplary alternative load;

FIG. 20b shows top view of a restraining device of the crane with an exemplary load;

DESCRIPTION OF SPECIFIC EMBODIMENTS

Figure 1:
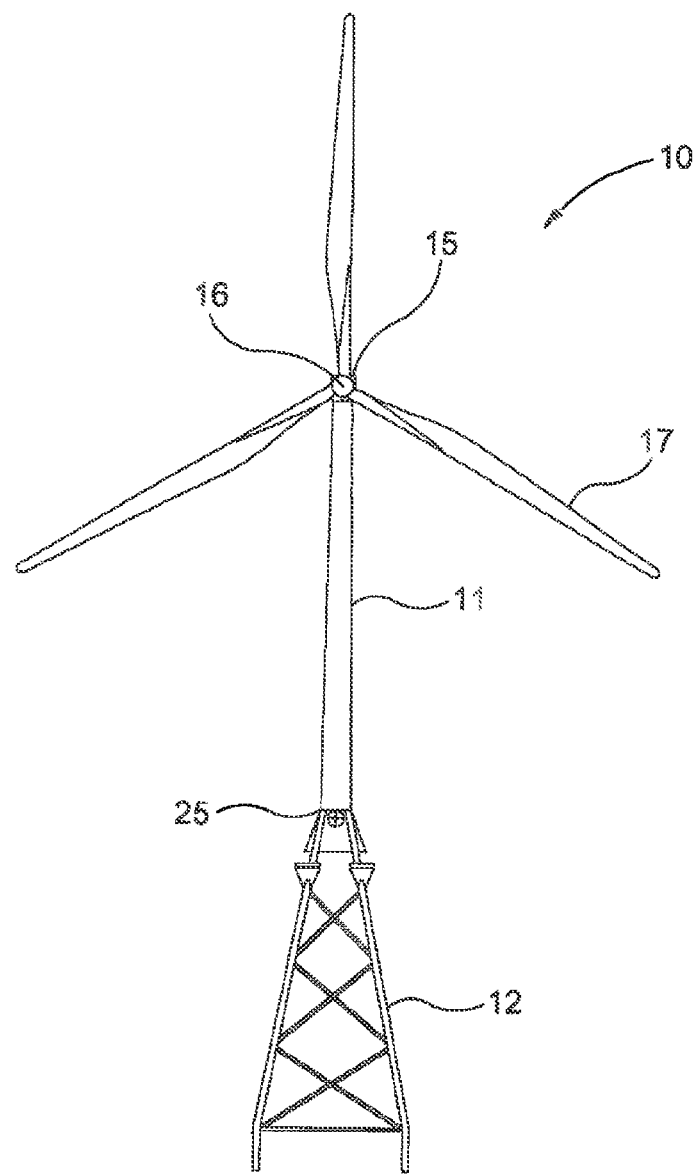
FIG. 1 shows an example of a wind turbine structure comprising a tower and support.

FIG. 1 shows an example of a structure 10 for siting offshore. Here, the structure 10 is a wind turbine structure 10, comprising a tower 11 that is supporting a turbine 16, comprising a nacelle 15 and blades 17. The tower 11 is attached at an attachment region 25 to a support 12. Here, the support 12 is provided as a jacket, although in alternative examples, the support 12 may be a transition piece, or the like. The structure 10 may be for use at an offshore location in water deeper than 30 m, or in water between 30 m and 45 m deep. Alternatively, the offshore location may be in water deeper than 45 m.

In use, the support 12 can be transported to an offshore site, and secured to seafastening sockets (not shown). The tower 11 is then attached to support 12 at the attachment region 25. The nacelle 15 and blades 17 can be also attached to provide the completed structure 10 at site.

Due to the manner in which the structure 10 is constructed, it may be difficult to manoeuvre each piece into appropriate alignment, when at sea. Similarly, testing of the completed structure 10 must occur when the structure 10 is completed, and in situ. In view of this, there is a significant amount of risk involved when constructing the structure 10 offshore, as well as the risk that environmental factors may adversely affect the construction process.

FIG. 2 shows an enlarged section through the left-side of an attachment region 125 of a structure 100. The structure 100 is similar to the structure 10 of FIG. 1 in many respects, like parts being denoted by numerals multiplied by 10. The structure 100 of FIG. 2 comprises a tower 110 and a support 120. However, in this example, the structure 100 also comprises a transport element 150, which is provided at the attachment region 125.

Here, the transport element 150 is configured as a protrusion, which in this case is an annular protrusion, that extends around an outer facing side 160 of the tower 110. The transport element 150 is comprised at a flange 170 provided at the attachment region 125 for attachment of the tower 110 to the support 120. In this example, bolts 180 are used to attach the tower 110 to the support 120 at the attachment region 125 using the flange 170 of the tower 110 and a complementary flange 175 of the support 120.

It will be appreciated that this attachment region 125 is generally configured to support the applied mechanical moment generated when the turbine is operating at full operational power. However, when not installed, this moment capacity is essentially not utilised by the turbine.

FIG. 2 also shows a cross-section of a clamp 200. The clamp 200 is also annular, but is provided in two or more portions (not shown here), as will be described, in order to allow for positioning of the clamp 200 around the structure 100.

The clamp 200 comprises an engagement element 190, which in this example is provided as a recess. The engagement element 190 of the clamp 200 is configured for complementary mating with the transport element 150 of the structure 100. Here, the transport element 150 and the engagement element 190 are configured to provide an interference mating or fit.

In this example, both the transport element 150 and the engagement element 190 have tapered portions 155a, 155b, 195a, 195b. The tapered portions 155a, 155b of the transport element 150 taper radially such that the transport element 150 is essentially narrower at an outer radius. Tapered portions 155a, 155b are provided on both an upper and lower side of the transport element 150. The tapered portions 195a, 195b of the engagement element 190 are provided in a complementary manner to those of the transport element 150. This can, in some cases, assist with locating the clamp 200 with the transport element 150, when in use. Complementary tapered portions 195a, 195b can also, in some cases, help with the interference mating between transport element 150 and engagement element 190.

In effect, the weight of the structure 100 can, in some cases, be held by using the engagement element 190 and transport element 150. Depending upon the mechanical characteristics of the tower 110, it might be unhelpful in some circumstances if the clamp 200 were to exert any significant clamp force on the tower 110 directly. Therefore, in some examples, the weight of the structure 100 is carried substantially using the transport element 150.

FIG. 3a shows a similar cross-section of a similar structure 1000 having a tower 1100 and a support 1200. In this case, the structure 1000 comprises an alternative transport element 250 and complementary clamp 300 having an engagement element 290. Here, the transport element 250 comprises a tapered portion 255 on an upper side 257 therefore. The engagement element 290 comprises a complementary tapered portion 295. As can be seen in FIG. 3a, the clamp 300 extends along the structure 1000, and in this case the tower 1100, such that the engagement/transport elements can be considered to be provided at a lower portion of the clamp 300 (see FIG. 5).

FIG. 3b shows an axial cross-section of FIG. 3b, showing a portion of the complete circumference of the structure 1000.

Of course, while in the above examples, tapered portions on both transport element 150, 250 and engagement element 190, 290 have been shown to assist with location and/or an interface mating, it will be appreciated that this configuration is exemplary only. In some examples, only one of, or neither of, transport element 150, 250 and engagement element 190, 290 may have tapered portions.

While the transport element 150, 250 has been described in relation to the attachment region 125 provided with the tower 110, 1100, it may also be provided with an interface portion 800, configured to be provided between a tower 110, 1100 and a support 120, 1200.

FIG. 4a shows an example of such an interface portion 790, which is provided at the attachment region of the offshore structure, which in this example is a tower 11 for use with a support 12 (e.g. jacket, transition piece, etc.). Here, the interface portion 790 comprises a transport element 850 usable with the clamp 200, 300. It will be appreciated that the use of an interface portion 790 might allow for the clamp 200, 300 described to be used with existing structures 10. It will be appreciated that in some cases, the interface portion 850 can be retro-fit to the tower 11 or support 12. Retrofitting may occur after a structure has been installed at a wind farm, or before a structure has been installed (e.g. after a delivery but before installation of the structure).

FIG. 4b shows the interface portion 790 comprising a tapered transport element 850, while FIG. 4c shows the structure 150 and interface portion 790 comprised with the support 12 for ease of understanding. It will readily be understood that the interface portion may be provided with the support (e.g. transition piece, jacket, etc.) for subsequent attachment to a structure, such as a turbine tower.

While in the examples given above, the engagement element 190 has been described as a recess, or groove, and the transport element 150 has been described as a protrusion, it will be appreciated that in further examples, the engagement element 190 and/or transport element 150 may be configured with a plurality of protrusions and/or recesses (e.g. for complementary mating).

FIG. 5 shows a perspective view of the tower 110, 1100 of the offshore structure 100, 1000 comprising transport element 150, 250, and clamp 200, 300 with engagement element 190, 290 similar to that describe above. Here, as can be seen, the clamp 200, 300 comprises two clamp portions 310*a*, 310*b*. In this example, both clamp portions 310*a*, 310*b* comprise the engagement element 190, 290. The two or more clamp portions 310*a*, 310*b* can be considered to be configured as a split clamp, whereby the clamp portions 310*a*, 310*b* are separable to allow for insertion and clamping of a structure 100, 1000. In some examples, the clamp portions are separable by pulling apart one clamp portion 310*a* from the other 310*b*. In further examples, the clamp portions 310*a*, 310*b* are separable by connecting pivotally one portion 310*a* with the other 310*b* (e.g. hingedly connecting one portion with the other).

Again, as can be seen in FIG. 5, the clamp 200, 300 extends along the structure 100, and in this case the tower 110. It will be appreciated that clamping the structure 100, 1000 at the location indicated also increases the rigidity of the structure 100, 1000, particularly at the clamped location. This may be helpful when moving or restraining the structure 100, 1000.

In use, the structure 10, 100, 1000 can be positioned within the clamp 200, 300 such that transport element 150, 250, 850 and engagement element 190, 290 mate. The clamp 200, 300 can be used to lift and/or restrain the structure. The structure 10, 100, 1000 can then be transported, whether this be lifted to or from an onshore or offshore site, or whether this be restrained during travel to and/or from onshore/offshore sites, or the like. As such, there is no requirement for slings, or lashings, be used with cranes, etc. As a result the structure 10, 100, 1000 can be accurately position at an offshore wind farm.

It will also be appreciated, that by using the transport element 150, 250, 850 and clamp 200, 300 described above, that a wind turbine structure 10, 100, 1000 comprising support 12, 120, 1200, and tower 11, 110, 1100 (and optionally nacelle, etc.) can be transported from an onshore construction or assembly site to a barge as a completed structure. Similarly, the structure 10, 100, 1000 can be easily restrained during transport from the onshore site to the offshore site. In such cases, the structure 10, 100, 1000 can be assembled, tested, etc. at an onshore construction or assembly site, without the need to transport the structure 10, 100, 1000 in sections for assembly at site. Not only might this save time that the construction crew are at sea, but it also may reduce the likelihood of failure of the structure 10, 100, 1000 after having been assembled at sea.

In addition, in the examples where the clamp 200, 300 is configured to mate with the transport element 150, 250, 850 provided at an attachment region 25, 125 of the structure 10, 100, 1000, this means that the attachment region 25, 125 is additionally supported or restrained during movement or lifting of the structure 10, 100, 1000.

Furthermore, in the examples when the structure 10, 100, 1000 is partially or fully assembled (i.e. includes at least the tower 11, 110, 1100 and the support 12, 120 1200), it is possible configure the structure 10, 100, 1000 such that its centre of gravity is below the transport element 150, 250, 850. This means that when being transported (e.g. lifted or restrained), any movement that occurs will be less likely to cause the structure 10, 100, 1000 to topple, or cause unwanted acceleration/deceleration forces on the turbine.

In some example, when maintenance of the structure 10, 100, 1000, which has been installed at an offshore site, is required or desired, it is possible to disconnect the tower 11, 110, 1100 from the support 12, 120, 1200 and lift the tower 11, 110, 1100 using the transport element 150, 250, 850. There is no requirement to remove the entire structure 10, 100, 1000.

FIG. 6 shows apparatus 500 comprising the clamp 200, 300, along with the offshore structure 10, 100, 1000. The apparatus 500 is provided with a vessel 600, such as a barge. Here, the vessel 600 and apparatus 500 are configured to carry the structure 10, 100, 1000 to an offshore site.

Here, the apparatus 500 comprises one or more actuators 510, which in this example are provided by hydraulic actuators. The actuators 510 are usable to control rotational movement of the clamp 200, 300 off of its central axis. The apparatus 500 is further configured to restrain the structure 100, 1000, using the clamp 200, 300, away from or above a deck 610 of a vessel.

In use, the apparatus 500 is configured to compensate for pitching and rolling of the vessel 600, during transportation to or from an offshore site by using the actuators 510. In other words, the apparatus 500 is configured to maintain the structure 100 in an upright, or substantially upright configuration. The apparatus 500 may be considered to provide gimballing. It will be appreciated that the apparatus may be configured to maintain the structure 10, 100, 1000 in an upright, or substantially upright orientation, when lifting the structure 10, 100, 1000 from an onshore site or to an offshore site.

FIG. 7 shows an exemplary clamp 400 comprising trunnions 410. These trunnions 410 are configured to assist with controlling the rotation of the clamp 400.

Figure 8:
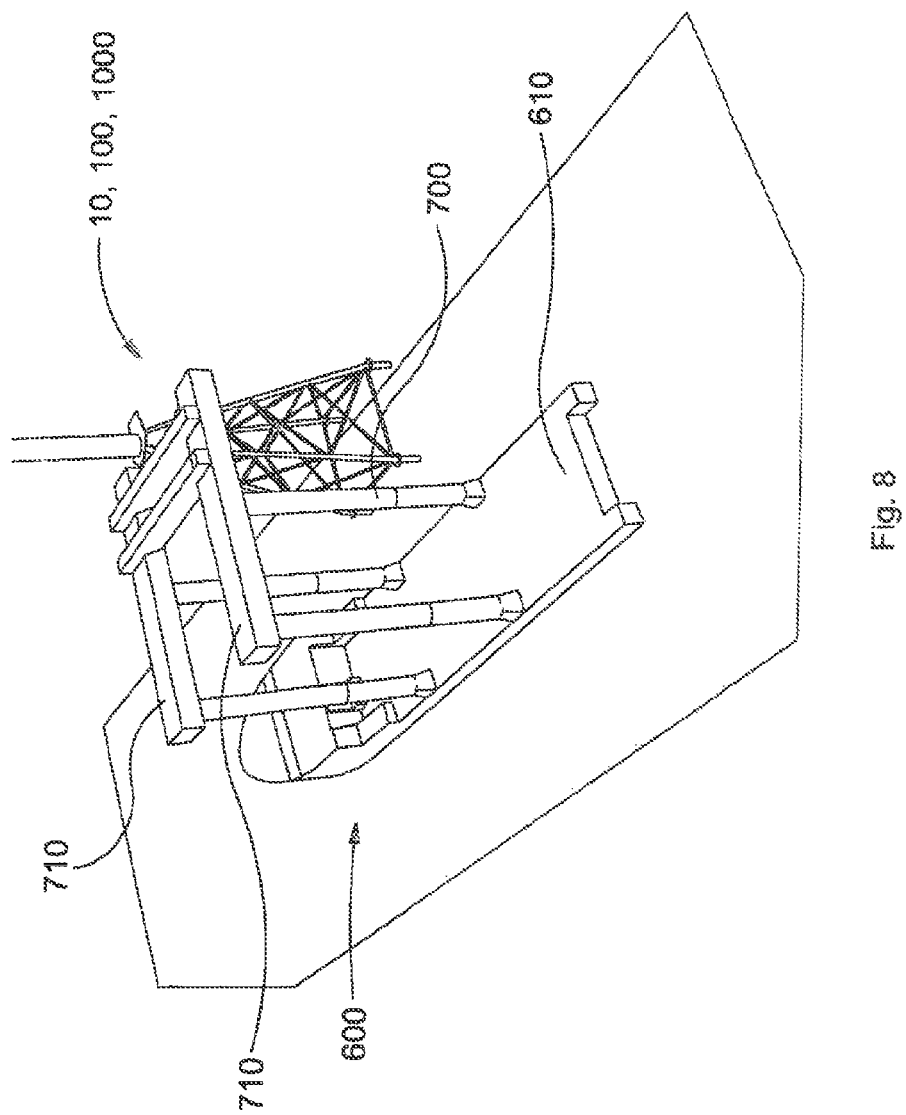
FIG. 8 shows a further example of apparatus with a lifting device.

FIG. 8 show a further embodiment of apparatus 700, comprising a clamp 200, 300, 400. Here, the apparatus 700 is again shown with a vessel 600 for transporting the structure 10, 100, 1000 to or from an offshore site. Here, the apparatus 700 is configured with rails 710, which allow for lateral movement of the structure 10, 100, 1000 from the deck 610 of the vessel 600 to an offshore or onshore site. The apparatus in this regard may be considered to provide a gantry for transporting the structure 10, 100, 1000.

It will be appreciated that the structure 700 of FIG. 8 may equally provide for correction of pitching and/or rolling of the vessel 600 in a similar manner to that described with respect to FIG. 6.

In some examples, it may be challenging to mate accurately the clamp 200, 300 with a transport element 150, 250 associated with a structure 100, 1000. In addition, it may be challenging to align accurately a tower with a jacket, transition piece, or the like, such that bolts and complementary bolt holes are aligned.

In a similar manner to FIG. 2, FIG. 9 shows radial cross-sections of apparatus 800 for allowing for transport of a structure 100, 1000, such as a wind turbine structure, however, in this instance from a right-hand side.

With reference to FIG. 9*a*, the apparatus 800, as shown, comprises a clamp 900 for clamping an offshore structure 10, 100, 1000, is a similar manner to those described above. The apparatus 800 further comprises a collar 810 having a recess 812 configured to be associated with the clamp 900.

In a similar manner to that described above, the apparatus 800 can be consider to be configured as a split ring. In other words, the apparatus 800 comprises a two or more clamp portions 902 as well as corresponding two or more collar portions 802. Collectively, these may be considered as retaining portions.

Here, the apparatus 800 is configured such that a handling portion 910 of the clamp 900 is substantially contained within the recess 812 of the collar 810, such that removal of the handling portion 910, and consequentially the clamp 900, from the collar 810 is inhibited. Of course, in further examples that need not be that case, and the clamp may be removably associatable with the collar 810.

Nevertheless, the apparatus 800 is configured to allow for relative movement between the associated clamp 900 and the collar 810. In this example, the clamp 900 is able to move radially and axially with respect to the collar 810. However, this movement is limited by configuration of the clamp/collar (e.g. the dimensions, or size of the recess 812 with respect to the handling portion 910 of the clamp 900).

The apparatus 800 further comprises a plurality of retainers 814. The retainers 814 are configured radially with respect to the collar/clamp 810, 900 and are configured to inhibit relative movement of the clamp 900 and collar 810, and thus to allow for transport of a clamped structure 10, 100, 1000 using the collar 810. For clarity, a single retainer 814 is shown in FIG. 9.

In this example, each retainer 814 comprises a locking actuator configured as a piston, extendable within the recess 812 in order to retain the clamp 900 (via the handling portion 910) with the collar 810. Of course, in alternative examples, the retainers 814 may be provided with the clamp 900, 910. In which case, they may be extendable from the clamp in order to retain the collar 810 with the clamp 900.

The apparatus 800 further comprises a plurality of positioning elements 816, again, displaced radially around the apparatus 800 in a similar manner to each retainer 814. In some examples, the apparatus 800 comprises corresponding retainers 814 and positioning elements 816, such as corresponding retainers 814 and positioning elements 816 spaced at common angular intervals. Again, for clarity only a single positioning element 814 is shown in FIG. 9.

The positioning element 816*a* is configured to extend into the recess and comprises a spring 816*a* (e.g. mechanical, hydraulic, etc.) and a roller 816*b*. Each positioning element 816 is arranged such that it extends into the recess by roughly 20 mm. The positioning elements 816 may be considered to be floating springs such that when the collar 810 and clamp 900 are held freely, the weight of the clamp 900 is supported by the positioned elements 816 without the positioning elements 816 (or at least the springs) compressing, or compressing to an extent that the clamp 900 abuts with the collar 810 at the positioning element 816. In other words, when the clamp 900 there are no external forces acting on the clamp, the clamp 900 does not abut with the collar 810, but rather the clamp 900 rests on the positioning elements 816. In addition, when the collar 810 and the clamp 900 are aligned (i.e. aligned in common plane (e.g. radial plane), then clamp 910 exerts a common, or roughly common, force on each positioning element 816. The rollers 816*b* associated with each positioning element 816 allow for ease of radial movement of the clamp 900 with respect to the collar 810.

The apparatus 800 further comprises a plurality of sensors 818, which in this example are optical sensors 818. The sensors 818 are configured to determine the position of the clamp 900 with respect to the collar 810. Furthermore, the sensors 818 are configured to determine the distance compressed by respective positioning elements 816, when in use. Such information can then be used to allow for the orientation of the collar 810 with respect to the clamp 900 to be adjusted.

In use, and as is shown in FIG. 9*a*, the apparatus 800 is brought into proximity of a structure 10, 100, 1000 (e.g. the apparatus is open, and subsequently closed around a structure 10, 100, 1000). The structure comprises a transport element 850, which in this example is similar to that described in FIG. 4. The clamp 900 is associated with the collar 810 and rests upon the positioning elements 816 (e.g. rests freely).

In FIG. 9*b*, the clamp 900 is moved such that it engages and clamps the transport element 850 of the structure 100, 1000. At this stage, the clamp 900 has been moved radially with respect to the collar 910. However, the clamp 900 may also have been rotated with respect to the collar 810, for example, if clamp 900 were to be inclined in order to be aligned and engaged with the transport element of the structure 10, 100, 1000.

In such cases, the positioning elements 816 of some of the apparatus 900 will be compressed to a particular extent, while the others will not. In addition, the clamp 900 may have been moved laterally (or radially) to a greater around at one radial region than another. FIG. 9*c* shows the apparatus 800 in which the orientation of the collar has subsequently been adjusted. It will be appreciated that each restraining portion 802, 902 may be adjusted independently in order to accommodate the configuration of the clamp/collar. In some examples, the apparatus 800 (e.g. collar 810) may be adjusted using an orientation assembly, as will later be described.

The adjustment of the collar 810 allows for any initial misalignment between the apparatus 800 and the structure/transport element to be corrected. Subsequent to any alignment correction, the retainer 814 is extended to engage the handling portion of the clamp so as to inhibit relative movement of the collar 810 and clamp 900, as is shown in FIG. 9*c*. From here, the collar 810 can subsequently be used to transport the structure, via the clamp 900. As such, the apparatus may be used to allow for minor misalignments between the apparatus 800 and a transport element 850 to be accommodated, and subsequently corrected, before transport of the structure. In addition, the use of such apparatus 800 may reduce the chance of jamming between the clamp 900 and structure 10, 100, 1000.

FIG. 10*a* shows a perspective view of the apparatus 800 comprising a clamp 900 and collar 810 in an open configuration, while FIG. 10*b* shows the apparatus 800 in a closed configuration. Here, the apparatus 800 is shown comprising three retaining portions 800*a*, 800*b*, 800*c*. The retaining portions 800*a*, 800*b*, 800*c* are pivotally connected (e.g. hingedly connected) in order to allow for opening and closing of the apparatus 800 around a structure 100, 1000 (not shown). In alternative examples, of course, the portions may not be connected (e.g. may be open and subsequently brought together in order to clamp a structure 100, 1000). Here, each retaining portion 800*a*, 800*b*, 800*c* comprises a clamp portion 902 and a corresponding collar portion 802.

The apparatus 800, in this example, further comprises an orientation assembly 870. The orientation assembly 870 comprises six actuators 875 configured to allow for relative movement of the clamp 900, and thus relative movement of the clamped structure 100, 1000, with respect to a lifting device (not shown). The orientation assembly 870 is configured to allow for three-axis translation, pitch, yaw and roll. The assembly 870 allows for correction of heave, sway and surge. The assembly 870 may be considered to resemble a hexapod. Shown in FIG. 10, the orientation assembly 870 is in communication with a sliding table 890 to allow for further movement (e.g. coarse movement) of the apparatus 800 with respect to a lifting device.

The actuators 875 are pivotally attached to the retaining portions 800a, 800b, 800c. The actuators are also pivotally attached to the sliding table (or, in effect, pivotally in communication with a lifting device) such that the assembly 870 is able to configure the apparatus 800 in the open configuration and in the closed configuration. In other words, the actuators 875 of the assembly 970 can be used to open and close the retaining portions 800a, 800b, 800c in order to allow for insertion of a structure. In this example, the actuators 875 are attached to the apparatus 800 at interface regions 805 of the retaining portions (e.g. the regions when one collar/clamp portion is configured to meet (e.g. radially meet), with a further collar/clamp portion)—see FIG. 11a.

FIG. 11a shows a perspective view of the apparatus 800 in an open configuration in which the interface portion 790 comprising the transport element 850 is shown. FIG. 11b shows a perspective view of the apparatus 800 in a closed configuration in which the clamp 900, which in this example is held closed by use of a retaining bolt 950.

It will be appreciated that the use of an orientation assembly allows for corrective movement to be applied to a structure 10, 100, 1000 being transported (e.g. to correct for one or more of: pitch, roll, yaw, heave, sway, surge, etc.). However, the assembly 970 further allows for minor movement (i.e. minor movements with respect to coarse movements a lifting device) to be provided. The assembly is further able to rotate a structure 10, 100, 1000 such that it is able to be aligned with (e.g. aligned and mated with) an existing structure. In the example of wind turbine structures, the assembly is able to open and close the clamp around a structure, as well as provide correction of collar and clamp, and in addition, readily manoeuvre the structure with respect to a jacket or transition piece (e.g. rotate, tilt, and/or translate the structure to allow for mating).

FIGS. 12a and 12b shows perspective views of the apparatus 800 configured around a structure to be transported. FIG. 13a shows a lifting device (e.g. a crane) 80 using the apparatus 800 to transport a structure 100, 1000 to and/or from a barge. FIG. 13b shows the lifting device 80 using the apparatus 800 to retain a structure. FIG. 13b shows the lifting device 80 using the apparatus 800 to retain a structure 100, 1000. FIG. 13c shows the lifting device 80 using the apparatus 800 to position a structure 100, 1000 at an offshore site. FIG. 13d shows the lifting device 80 transporting a structure, which in this case is the tower of a wind turbine. In FIG. 13d the tower is being replaced during maintenance, while the jacket, monopile or transition piece remains in the water.

It will readily be appreciated that coarse control of the position and elevation of the apparatus, and therefore the structure 100, 1000 can be achieved by slewing and elevating the lifting device (e.g. crane boom), and/or extending or retracting the sliding table.

In addition, when the vessel is in motion (e.g. because of transportation and/or sea conditions, etc.) the lifting device and sliding table follow major movement, while the orientation assembly is able to adjust to follow the minor movements.

Elevation and/or horizontal alignment of the structure 10, 100, 1000 can be controlled by a using positioning signals, such as signals from a GNSS receiver (e.g. receiver configured to receive one or more of: GPS signals, Galileo signals, GLONASS, signals, etc.), such as those able to provide millimetre accurate distance (e.g. millimetre accuracy from the centre of the earth). This is information can be provided to the orientation assembly 870 in order to keep the structure 10, 100, 1000 upright. In addition, this information can be provided to the lifting device 80 and the orientation assembly 870 in order to allow for mating or removal of a structure from/with a preinstalled foundation, jacket foundation structure, or preinstalled seabed piles, etc.

It will be appreciated that in some embodiments, the apparatus 800 may not be provided with a collar 810, wherein the orientating assembly 870 is in communication with the clamp 900, or clamp portions 902, (e.g. direct communication) in order to clamp a structure. Similarly, in some embodiments, the apparatus 800 may not be provided with an orientation assembly 870, but nonetheless may be provided with a collar 810 for association with the clamp 900.

Figure 14B:
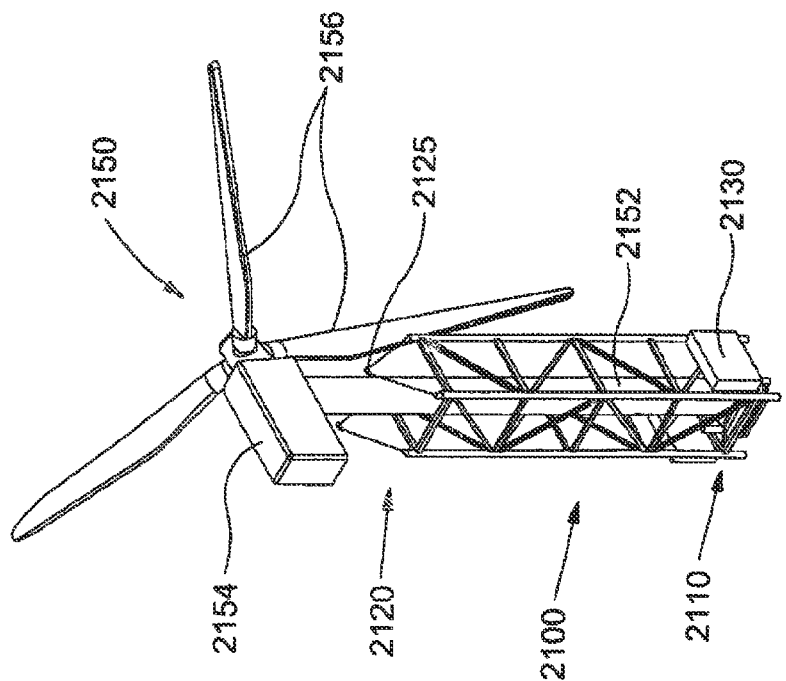
FIG. 14b shows the apparatus associated with a structure.
Figure 14A:
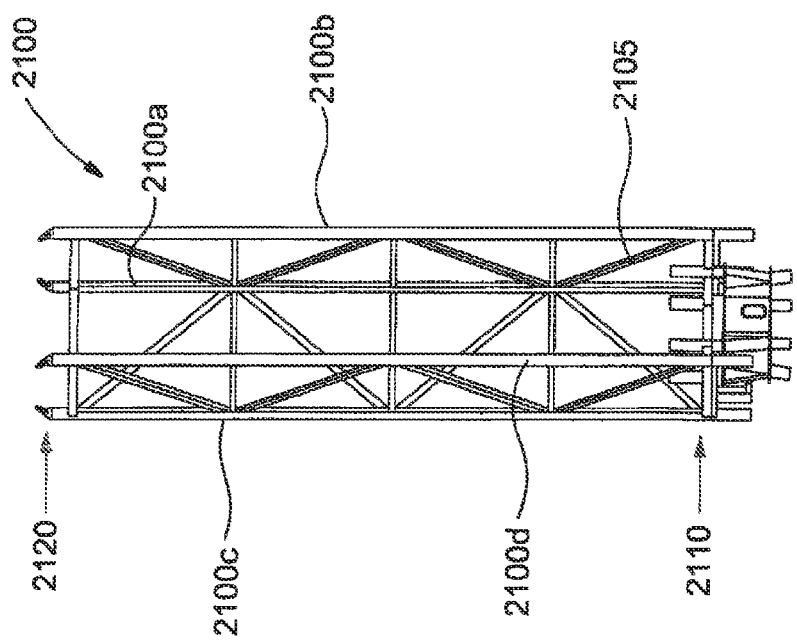
FIG. 14a shows an example of apparatus for an offshore structure comprised with a coupling mount.

FIG. 14a shows a further example of apparatus 2100 for use with a structure (e.g. lifting, transporting, etc. a structure), such as an offshore structure 10, 100, 1000 similar to those described above. Here, the apparatus 2100 is shown as being comprised with a coupling mount 2400, which is shown as a transition piece, as will be described in further detail below.

In this example, the apparatus 2100 is essentially constructed as a frame comprising four main struts 2100a-2100d, which are connected on three sides with crossbeams 2105, and which serve to define an exterior to the apparatus 2100. Beams are absent, or not present in the same manner, on one side of the apparatus 2100 (e.g. between particular main struts 2100b and 2100d) to allow for insertion and removal of a structure as will be described. This may be considered to be a gated side. In some cases, the apparatus 2100 may be provided with a physical gate usable to open and close to allow insertion and removal of a structure.

The apparatus 2100 comprises a restraining region 2110, which in this example is at a lower region of the apparatus 2100 (i.e. when the apparatus 2100 is oriented for lifting). The restraining region 2110 is configured to restrain an offshore structure so as to associate the apparatus 2100 with that structure. The restraining region 2110 is effectively configured to mitigate movement of an associated structure with respect to the apparatus 2100.

FIG. 14b shows the apparatus 2100 further comprising ballasts 2130. In this example, two ballasts 2130 are provided, which are at the exterior of the apparatus 2100. The ballast 2130 are provided by ballast tanks, which can be filled and/or emptied (e.g. filled with water, such as sea water). FIG. 14b further shows the apparatus 2100 associated with a structure 2150, which in this example is a wind turbine structure 2150. Here, the wind turbine structure 2150 comprises a tower 2152, a nacelle 2154 and turbine and blades 2156. In other words, the structure 2150 is similar to that shown in FIG. 1, but without, in this case, the support (e.g. jacket). The apparatus 2100 is configured to extend along the tower 2152 of the structure 2150, when associated.

FIG. 14b further shows the apparatus 2100 comprising a lifting region 2120, configured to allow for lifting of an associated structure. The lifting region 2120 has a lifting point 2125 from which the apparatus 2100 can be lifted using a crane, or the like. FIG. 15a shows the lifting region 2120 in more detail, which is in communication with a hoisting crane.

FIG. 15b shows the restraining region 2110 in more detail, along with an attachment region 2160 of the associated structure 150. In a similar manner to the attachment regions described above, the attachment region 2160 here is associated with the location at which the structure 2150, which in this case is a tower 2152, attaches to a support (e.g. a jacket, or transition piece, or the like).

The restraining region 2110 comprises a clamp 2170, configured to associate with the structure 2150 in order to restrain that structure 2150. In this example, the clamp 2170 comprises three clamp portions 2170a-2170c, which are separable in order to allow for insertion and/or removal of the structure 2150. Essentially, the clamp portions 2170a-170c are again configured as a split clamp.

FIG. 15b shows the clamp 2170 in a closed configuration, in which the clamp 2170 surrounds, or at least mostly surrounds, the associated structure 2150. The clamp 2170 (e.g. clamp portions 2170a-2170c) are configure to be opened and/or closed using pistons 2175. In this example, each clamp portion 2170a-2170c is associated with one piston 2175. The clamp portions 2170a-2170c are configured to open/close radially.

In this example, and in a similar manner to the examples describe above, the clamp 2170 is provided with an engagement element 190, as shown in FIG. 2. As such, the clamp 2170 is able to be associated with a transport element 150, 850 of a structure, in the manner described in relation to FIGS. 2, 3 and 4.

FIG. 16 shows the lower region of 2115 of the apparatus 2100 comprising the restraining region 2110 (i.e. lower when the apparatus 2100 is oriented for lifting). Here, the clamp 2170 is not shown for ease of explanation. As can be seen, the restraining region 2110 comprises a retainer 2115, which in this example is a plate. The retainer 2115 is configured to allow a structure 2150 to be associated with the apparatus 2100. The retainer 2115 is configured to allow the structure to be inserted and removed from the side of the apparatus 2100 (i.e. the side without beams, or beams populated in the same manner). In this example, the retainer assists locating a structure, such as a tower, centrally with respect to the apparatus 2100.

As can be seen in FIG. 16, the apparatus 2100 also comprises four mounting elements 2310a-310d, configured to allow the apparatus 2100 to mount with a coupling mount 2400, as will be described. The mounting elements 2310a-310d are configured for associating, which in this example is complementary mating, with corresponding mounting elements 2410a-2410d of such a coupling mount 2400.

FIG. 17a shows an example of a coupling mount 2400, which is shown as a transition piece. The transition piece may be for use with a pre-exiting or installed jacket, or may be for use with a jacket to be installed. As can be seen, the coupling mount 2400 comprises complementary mounting elements 2410a-410d. However, in this example, the mounting elements 2410a-2410d are of differing heights, with one mounting element being tallest 2410a, and two being roughly equally smallest 2410c, 2410d (the further mount having a height somewhere in-between). As an alternative, FIGS. 17b and 17c shows an example of a coupling mount 2470 provided with a jacket (e.g. instead of using a transition piece).

It will be appreciated that in some example, the coupling mount 2400 may be configured for use onshore, and/or configured for use during transit (e.g. when transporting a structure to an offshore site). For example, the coupling mount 2400 can be configured for use on the desk of a vessel. In that regard, the coupling mount may not be configured in the manner of a transition piece, but may still be configured with mounting elements 2410a-410d for complementary mounting with apparatus 2100.

As is shown in FIG. 16, the mounting elements 2310a-2310d of the apparatus 2100 are provided as recesses, which are configured to mate with the mounting elements 2410a-2410b of the coupling mount 2400. Each mounting element 2310a-2310d of the apparatus 2100 however comprises one or more dampeners (not shown), configured for use when mounting the apparatus 2100 to the coupling mount 2400. The dampeners allow the apparatus 2100 to be located with the coupling mount 2400 under the weight of the apparatus 2100, and lowered to position using the dampeners. Here, the apparatus 2100 also comprises a bump-bar 2320, configured assist with the location of the apparatus 2100 with respect to the coupling mount 2400.

In use, as is shown in FIG. 18a, structures 2150 can be constructed with the apparatus 2100 (e.g. at an onshore location 2500). In this case, the structures 2150 are wind turbine structures, which, when assembled, can be considered to be "top-heavy" due to the weight of the turbine and blades, etc. compared to the tower. Although not shown in FIG. 18a, in some examples, the apparatus 2100 is mounted with a coupling mounts 2400, which in turn are secured to the onshore site.

During construction, the clamp 2170 is configured to retain the structure 2150 with the apparatus 2100. After the wind turbine structure 2150 has been fully or partially completed, the apparatus 2100 can be lifted onto a transportation vessel, or the like, using the lifting region 2120, as is shown in FIG. 18b. In this case, because the restraining region 2110 is restraining the structure 2150 so as to associate the apparatus 2100 with the structure 2150, and mitigate movement of the associated structure with respect to the apparatus 2100, the apparatus 2100 is therefore configured so as to modify the effective centre of gravity and/or inertia of the associated structure 2150, from that of the un-associated structure 2150. The effective centre of gravity or inertia can be considered to be the centre of gravity or inertia of the combined assembly (i.e. when the structure is associated, or restrained, with the apparatus).

As such, it is possible to lift and transport the structure 2150 without inducing excessive movement, which may cause harm to the structure (e.g. from inertial effects, forces associated with acceleration or deceleration, etc.). In effect, it is possible to provide a stable lift/transport in which the effect of horizontal accelerations on the assembly (i.e. apparatus and structure) do not necessarily cause the assembly to swing and gyrate about the lifting point.

In some examples, it is possible to modify the centre of gravity and/or inertia such that it is at, or around the lifting region 2120, or lifting point 2125 (e.g. by selection of a particular weight, or size, of apparatus). As can be seen in FIG. 18b, the ballast 2130 can be used to assist with modifying the effective centre of gravity and/or inertia. It will also be appreciated that in some examples, the size of the apparatus is adjustable in order to provide modification. In some examples, both the height of the apparatus and the ballast is adjusted.

From an onshore site 2500, the apparatus 2100 and associated structure 2150 can be loaded on to a transportation vessel 2600 as is shown in FIG. 18c. In this case, the apparatus 2100 is located on coupling mounts 2450, which, in this example, can be moved round a deck in order to stow for transport and to bring within the reach of a crane, or hoist, etc. Of course, in other examples, the mounts 2450 may be fixed.

Once transported to an offshore site, the apparatus 2100 comprised with the associated structure 2150 can be maneuvered into position with respect to a pre-existing support 2700 comprising a coupling mount (i.e. as is shown in FIG. 17c). Again, because of this can be done while mitigating the chance of inertial effects cause damage. In addition, the achieved stability allows for ease of location.

FIGS. 18d and 18e shows the apparatus 2100 (structure 2150 omitted for clarity) being located with a coupling mount 2400, which in this example is a transition piece. Here, the bump-bar 2320 initially contacts the tallest mounting element 2410a in order to locate the apparatus with the coupling mount 2400. The apparatus is configured such that bump-bar effectively aligns corresponding mounting elements between the apparatus 2100 and the coupling mount 2400. From there, subsequent mounting elements can be mated, and the apparatus can be lowered onto the coupling mount 2400, (e.g. using the dampeners).

In some cases, the structure may comprise one or more podgers for aligning the attachment region with the complementary attachment region of a support, or jacket. In such cases, the mounting elements may be considered to provide a first alignment (e.g. +/−8 mm), and the podgers provide a second alignment (e.g. +/−2 mm). The first alignment may be considered to be coarser than the second.

As the apparatus 2100 is lowered onto the mounting elements of the coupling mount, the dampeners (e.g. retarders, such as hydraulic retarders) act upon those mounting elements a progressively slow the decent of the structure/apparatus. In some cases, the full weight of the assembly can be lowered using the dampeners (e.g. for the last 100 mm).

After the apparatus 2100 has been located, it can be secured to the coupling mount 2400 (e.g. secured to the support, or transition piece). Prior, or subsequently, the clamp portions 2170a-2170c can be moved, and the clamp 2170 effectively opened. From there, the apparatus 2100 can be removed from the structure 2150.

While in the above example, the apparatus 2100 has described for use with a particular attachment region of the structure 2150, it will be appreciated that in further embodiments that need not always be the case. In some examples, the restraining region 2110 of the apparatus 2100 may be configured for use with an additional or alternative attachment region (e.g. an attachment region provided at a tower/nacelle interface). In further examples, the apparatus 2100 may be configured to restrain a structure additionally or alternatively along a portion of the structure (e.g. tower, or the like), for example, not at an attachment region. In addition, the apparatus 2100 may be configured to associate with a structure without the use of a clamp 2170, as described. For example, the apparatus 2170 may be configured to associate with a structure by using fixed retainers, or the like, provided in a complementary manner on the apparatus and a structure. In addition, while in the above example the transport element has been described essentially as a protrusion, and the engagement element as a recess, it will be readily understood that in some cases, transport element be essentially a recess, and the engagement element may be essentially a protrusion. In some cases, the transport element and engagement element may comprise a plurality of complementary protrusions and/or recesses. Skilled persons will readily be able to provide such alternative embodiments.

It will also be appreciated that any of the aforementioned transport element 250 850, engagement element 190, clamp 170, apparatus 100 or structure 150 may have other functions in addition to the functions described above. In addition, it will be readily understood that the apparatus 2100 described in relation to FIG. 14, for example, may additionally or alternatively comprise features as described in respect of any of the FIGS. 9 to 11. So, for example, the clamp 2170 described in relation to the apparatus 2100 of FIG. 14 may comprise any of the features of the clamp 900 of FIG. 9. Additionally, or alternatively, the apparatus 2100 may comprise one or more actuators 875, in some cases, configured in a hexapod configuration.

In some cases, for example in poor weather conditions, it may be helpful to additionally support the lifting and/or lowering of the apparatus 2100. For example, even though the apparatus may comprise ballasts, it nevertheless may swing, twist, or otherwise rotate (either slightly or significantly) when moving (e.g. listing) a structure, such as a wind turbine structure, to and/or from the deck of a vessel. The ability to stabilise the structure further, for example, during the lifting operations, may increase the ease with which a structure can be located/positioned, either on a deck or at an offshore location. Additionally, or alternatively, the ability to stabilise the structure (e.g. the structure itself, or the lifting apparatus 2100), may also increase the ability to deploy in more adverse weather conditions, than had been acceptable previously.

Consider now FIG. 19a, which shows a hoisting crane 3000 for use with structures, such as offshore structure (e.g. jackets, wind turbine structure, etc.). While the following example is described in relation to a lifting (e.g. deployment and/or retrieval), it will be readily appreciated that the same, or similar, hoisting crane may be used on land, or even on a different vessel (e.g. a jack up rig).

Here, the crane 3000 comprises a hoisting boom 3010, in a typical manner. The boom 3010 has a lifting region 3020, from which a load can be hoisted. In this example, the crane 3000 is fixed to the deck 3030 of a ship, but can rotate (e.g. slew) in a known manner in order to lift and transport loads to and from the deck of the ship to an offshore site (e.g. lift and place loads, such as the structures described above, onto offshore supports).

However, in this example, the crane 3000 further comprises a restraint device 3040. The device 3040 can be considered to extend from the crane 3000, and is actutable so as to be able engage with a load 3050 being lifted. The load 3050 shown in FIG. 19a is the lifting apparatus 2100 described above, associated with the wind turbine structure.

As will be further described, the restraint device 3040 is configured so as to extend, and couple, with the load 3050 being lifted so as to control (e.g. inhibit or mitigate) certain movement. In this example, the device 3040 is configured to inhibit rotational pivoting movement (e.g. swinging) of the load 3050 about, or with respect to, the lifting region 3020, in at least one direction. Of course, as will be appreciated given the following discussion, the device 3040 in this embodiment can be considered to inhibit rotational movement about that pivot in more than one direction, when coupled with the load 3050. Inhibiting such swinging movement may be considered to be inhibiting horizontal movement of a load 3050 with respect to the crane 3000 in at least one direction.

In addition, or alternatively, the device 3040 may be configured to control rotational movement of a body axis 3060 of the load 3050 with respect to the lifting region 3020. In some cases, the device is configured to maintain a fixed orientation, i.e. not significantly permit the load 3050 to twist with respect to the lifting region 3020. In further examples, the device may be specifically configured to control the movement of the load, so as to twist and orientate the load, with respect to the lifting region. Such a configuration may assist with locating an offshore load (e.g. a turbine structure, transition piece, or lifting apparatus 2100), with respect to an offshore support (e.g. a jacket).

To assist with lifting and lowering of a load 3050, the device 3040 is however configured to allow that coupled load 3050 to translate with respect to device 3050. In other words, the load can move (e.g. slide) up and down when being lifted and/or lowered. Put another way, the device 3040 can be considered to allow a coupled load 3050 to move vertically with respect the lifting region 3020 (e.g. even when rotation in at least one direction is being controlled).

To achieve the above control of movement, the crane 3000, and device comprises one or more couplings 3070. In this particular example, the coupling 3070 may be considered to be configured as forks, or the like, which mount with the load 3050. Of course, other couples could be envisaged. In the example shown, the device 3040 comprises two couplings 3070, which are actuatable to couple with the load 3050 (e.g. adjustable to accommodate larger, or smaller loads 3050). In this example, the couplings 3070 do not fixedly attach to the load 3050, but rather abut the load 3050, so as to control movement. Of course, in other examples, that need not be the case, and the couplings 3070 may affix to the load.

The couplings 3070 are provided on one or more extendable arms 3080, which extend from a crane body 3000. Here, the arms 3080 are also actuatable so as to extendable and/or retractable from the crane 3000 and permit mounting or coupling of the device 3040 with a load 3050 (arms movable along axis 3090). In some examples, the arms are independently controllable, which may help control twisting of the load.

As will be appreciated with respect to FIG. 19a, the crane 3000 is also configured such that the device 3040 and the boom 3010 rotate together, for example, to allow the load 3050 to be moved to/from the deck 3030 of a ship. In such a manner, the boom 3010 and the device 3040 of this example can be considered to be in a fixed rotational relationship with one another.

In other examples, the crane 3000 is configured such that the device 3040 and boom 3010 can move, such as rotate, independently of each other. For example, the device 3040 and boom 3010 can be independently controlled. The device 3040 and the boom 3010 can be configured to allow the device 3040 to be slewed independently with respect to the boom 3010. Relative movement of the device 3040 with respect to the boom 3010 can allow for an angling or adjustment of the load. In similar words, the independent rotational relationship between the boom 3010 and the device 3040 may be used to obtain an improved alignment of the device/load with respect to the boom 3010.

In use, a load 3050 is coupled to the lifting region 3020 of the boom 3010 of the crane 3000. This may be on a deck of a ship. In addition, the arms of the device extend so as to allow the couplings 3070 to engaging the load 3050. The couplings may be actuated along the axis 3085 shown in FIG. 19a to permit restraining of the load 3050. This may provide a restraining force sufficient to control rotational movement, but not prevent, vertical movement (in some examples, the couplings may abut the load 3050, as nevertheless achieve this).

Figure 19B:
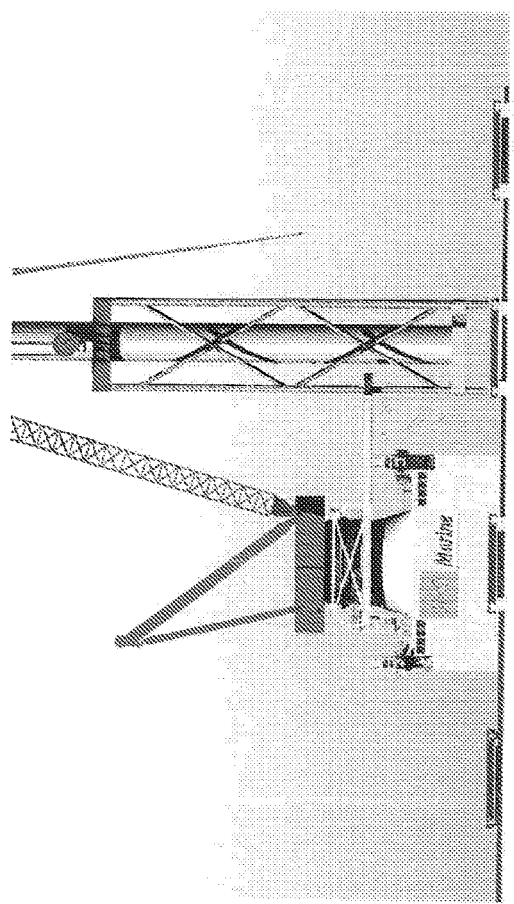
Figure 19C:
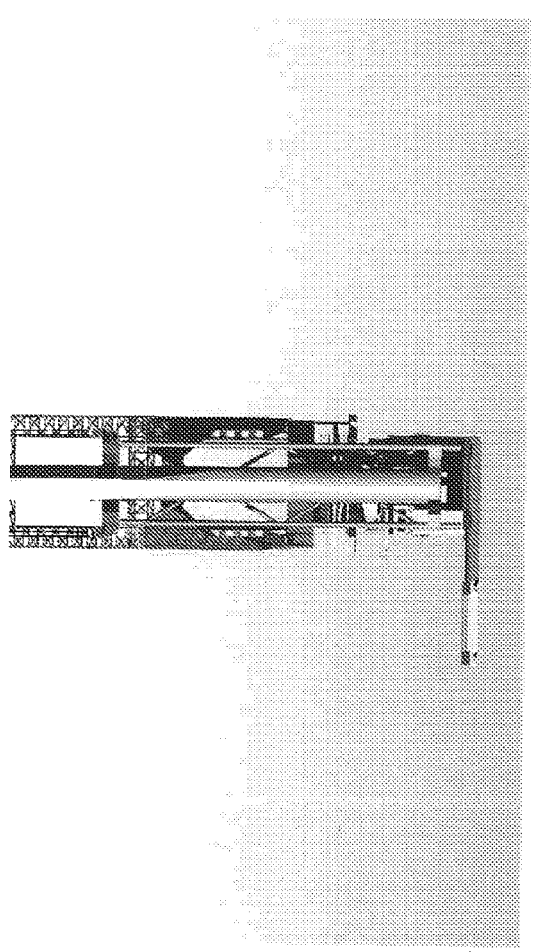

As the load is lifted, the device 3040 is effectively used to engage with the load 3050 so as to control (e.g. inhibit) rotational movement of that load 3050 the with respect to the lifting region 3020 in at least one direction. At the same time, the device 3040 is configured to allow the load to translate (e.g. vertically) through the device 3040. As such, the crane 3000 can lift the load 3050 from the deck of a ship, and rotate through 90 degrees, or so, so as to slew the load off of the ship, and allow deployment at an offshore location, while at the same time controlling the movement of the load 3050. FIG. 19b shows a side view of the load on a deck, while FIG. 19c shows a corresponding front view.

It will be appreciated that the above described crane 3000 may be particularly useful in times when weather conditions, or the like, cause the ship to move (e.g. pitch, roll, and/or yaw), which would otherwise cause the load to swing or twist uncontrollably, with respect to the ship during deployment. As such, using the crane 3000 described here, it may be possible to deploy such offshore structures and loads 3050 in more extreme weather conditions, than has since been possible. In some examples, the load 3050 may comprise a bump bar, which could be hydraulic, at a lower region (e.g. similar to that described above) to assist further and allow for ease of location of the load with respect to a pre-installed offshore location.

While the above example has been described in relation to the lifting apparatus 2100 for lifting a structure, such a wind turbine structure, it will readily be appreciated that the crane 3000 may equally be appropriate for use with many other loads 3050.

Consider, by way of an example, FIG. 20a, which shows a perspective view of the crane 3000 in use with a jacket 4050. Here, the couplings 3070 are again provided on the extendable arms 3080, which extend from the crane body 3000. Again, the arms 3080 are also actuatable so as to extendable and/or retractable from the crane 3000 and permit mounting or coupling of the device 3040 with a load 3050.

In use, a jacket 4050 is coupled to the lifting region 3020 of the boom 3010 of the crane 3000, which again is shown on the deck 3030 of a ship. The arms 3080 extend, as before, so as to allow the couplings 3070 to engaging the jacket 4050 (e.g. the frame of the jacket). Again, the couplings are actuated along the axis 3085 shown in FIG. 20a to permit restraining of the load 3050 in an appropriate manner.

As the jacket is lifted, the device 3040 is effectively used to engage with the load 3050 so as to control (e.g. inhibit) rotational movement of that load 3050 the with respect to the lifting region 3020 in at least one direction. In this example, the lower section of the jacket is tapered, such that the coupling actuate along the axis 3080 so as to maintain control of the jacket 4050.

When in position, the device 3040 is also configured to allow the load to translate (e.g. vertically) there-through, and again, if helpful, actuate the couplings along the axis 3080 so as to maintain control.

As such, the crane 3000 again can lift the jacket 4050 from the deck 3030 of a ship, and rotate through 90 degrees, or so, so as to slew the load off of the ship, and allow deployment at an offshore location, while at the same time controlling the movement.

In some cases, the device 3040 comprises one or more restraining members 3075. The restraining members 3075 are configured to restrain a load 3050 against the device 3040, for example against the couplings 3070. In some example, the restraining members may comprise lashings, cablings, or the like. The restraining member 3075 can be configured to inhibit movement, such as sliding movement, of a load 3050, in at least one direction relative to the couplings 3070. In some examples, the restraining members 3075 are configured to attach between a load 3050 and the couplings 3070 in order to inhibit movement of the load 3050, for example, in particularly in poor weather conditions. In other examples, the restraining members 3075 can attach or fasten the load 3050 against the couplings 3070 as shown in FIG. 20b.

It will be appreciated that, after the jacket (or other such load) is placed in the water, the dampening effect of the water itself may allow the load to become manageable without further use of the device 3040. As such, and in some examples, the device 3040 may be used predominantly during slewing of the load from a deck, but not used (or not significantly used) during deployment of the load in water.

Figure 21A:
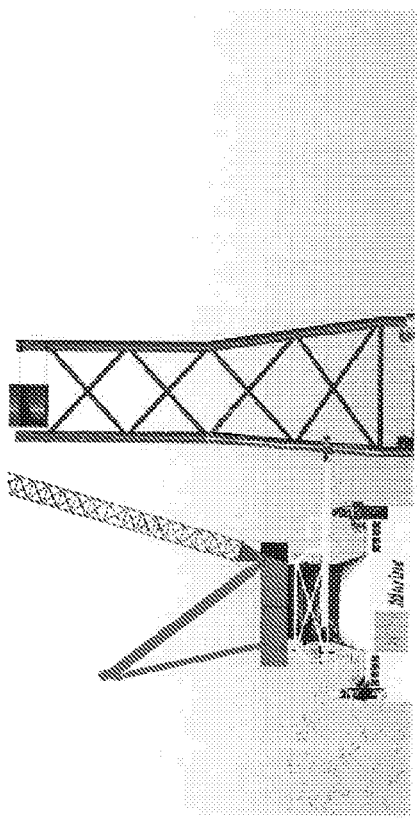
FIG. 21 shows view of a load on deck.
Figure 21C:
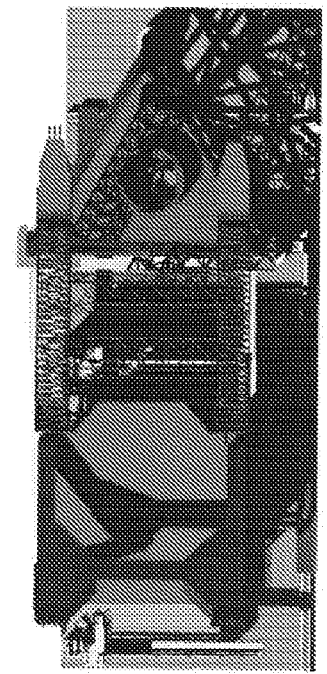
Figure 21B:
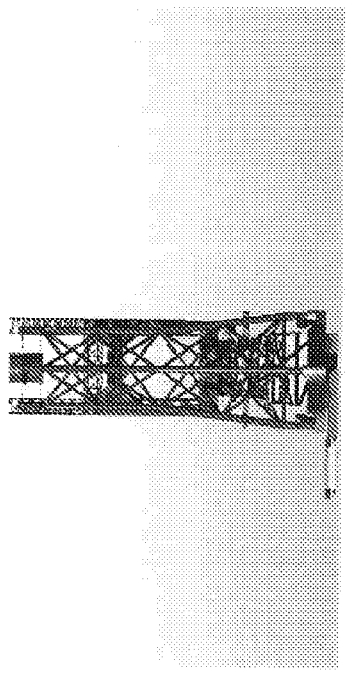
Figure 22A:
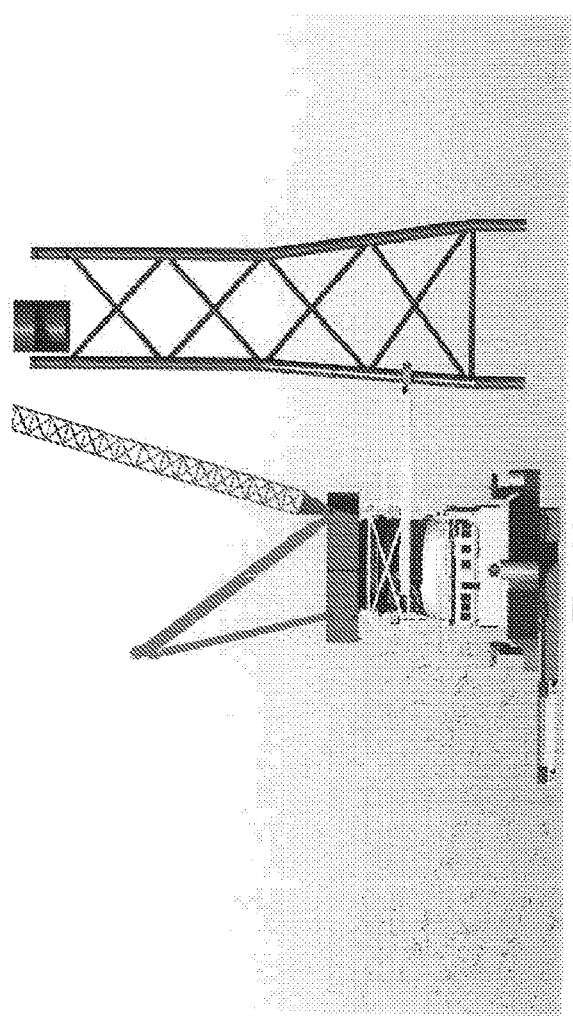
FIG. 22 shows view of a load slewed from a deck.
Figure 22C:
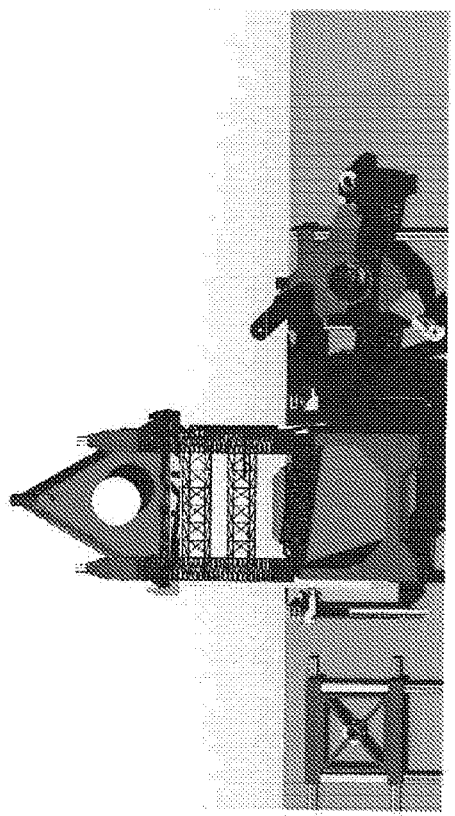
Figure 22B:
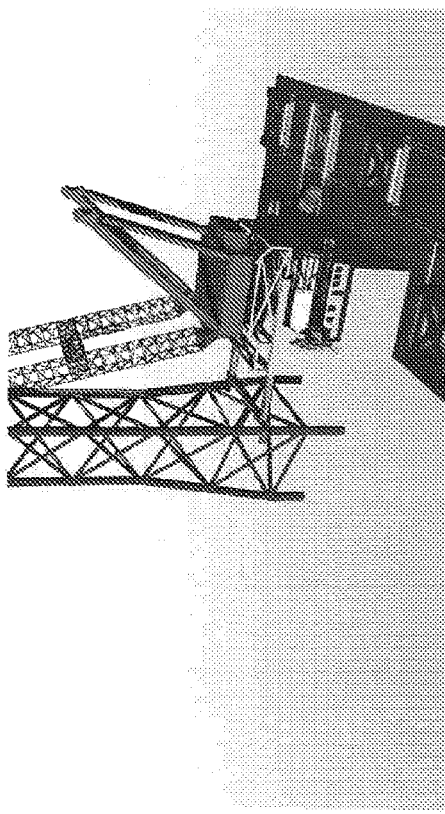

FIGS. 21a, 21b and 21c show corresponding side, front and plan views of the jacket and crane as shown in FIG. 20, respectively. FIGS. 22a, 22b and 22c show corresponding side, perspective, and plan views of the jacket 4050 being slewed from the deck of a ship using the crane 3000.

In some examples, the device 3040 is removable from the crane 3000, e.g. for maintenance or repair, or the like. In other examples, the device 3040 is retrofit to the crane.

It will be appreciated that any features of the above derived crane 3000 may be used with any of the features in the embodiments shown in FIGS. 1 to 18, and vice versa.

While in this specification the term, "offshore", has been referred to, it will be understood that this term is not to be considered to be limited to at sea, but rather offshore can refer to any region or expanse of water, such as, seas, lochs, lakes, forths, estuaries, etc. The embodiments described may be for use onshore or offshore. For example, in some cases, the apparatus described may be used for installation, maintenance, etc., of an onshore wind turbine site. While the above embodiments have been described with particular reference to wind turbines, it will readily be appreciated that the described apparatus 2100 may be used for alternative applications, such as transporting of oil and gas structures, or the like.

The applicant discloses in isolation each individual feature described herein and any combination of two or more such features, to the extent that such features or combinations are capable of being carried out based on the specification as a whole in the light of the common general knowledge of a person skilled in the art, irrespective of whether such features or combinations of features solve any problems disclosed herein, and without limitation to the scope of the claims. The applicant indicates that aspects of the invention may consist of any such individual feature or combination of features. In view of the foregoing description it will be evident to a person skilled in the art that various modifications may be made within the scope of the invention.

The invention claimed is:

1. A crane, such as a hoisting crane, comprising:
a hoisting boom having a lifting region, configured to lift a load; and
a restraint device, the restraint device being arranged underneath the boom and extending from a body of the crane, and configured to engage with the load being lifted;
wherein the restraint device comprises one or more actuable retractably extendable arms which extend from the body of the crane to the load and one or more couplings, the one or more couplings being provided on the one or more actuable retractably extendable arms, the one or more couplings being configured to control movement of the load with respect to the lifting region in at least one direction; and
wherein the crane is configurable such that the restraint device and the boom rotate together; and
wherein further the device comprises at least one pair of arms, the arms of the at least one pair of arms being arranged on either side of the body of the crane, and the arms of the at least one pair of arms are independently controllable.

2. A crane according to claim 1, wherein the device is configured to control movement in as much as inhibiting, or mitigating, certain movement.

3. A crane according to claim 1, wherein the device is configured to inhibit rotational pivoting movement of the load about, or with respect to, the lifting region, in at least one direction.

4. A crane according to claim 3, wherein the device is configured to inhibit rotational movement about that pivot in more than one direction, when coupled with the load.

5. A crane according to claim 1, wherein the device is configured to control rotational movement of a body axis of the load with respect to the lifting region.

6. A crane according to claim 1, wherein the device is configured to control the movement of the load so as to twist and orientate the load, with respect to the lifting region.

7. A crane according to claim 1, wherein the device is configured to control movement of the load in more than one direction.

8. A crane according to claim 1, wherein the device is configured to inhibit movement of the load with respect to the lifting region in at least two horizontal directions and allow the load to vertically translate with respect to the device when being lifted and/or lowered.

9. A crane according to claim 1, herein the one or more couplings are considered to be configured as forks.

10. A crane according to claim 1, wherein the one or more couplings are configured to couple, or mount with, the load, so as to inhibit movement in at least one direction.

11. A crane according claim 1, wherein the one or more couplings are adjustable so as to modify the coupling, or mounting, of the device, with respect to the load, during the lifting and/or lowering, so as to permit relative vertical movement of the load with respect to the device, but at the same time inhibiting movement in at least two horizontal directions.

12. A crane according to claim 1, wherein the one or more couplings are specifically configured to abut the load so as to inhibit movement.

13. A crane according to claim 1, wherein the device comprises one or more restraining members.

14. A crane according to claim 13, wherein the one or more restraining members are configured to restrain the load against the device.

15. A crane according to claim 13, wherein the one or more restraining members comprise lashings, or cablings.

16. A crane according to claim 13, wherein the one or more restraining members are configured to inhibit movement of the load in at least one direction relative to the one or more couplings.

17. A crane according to any of the claim 13, wherein the one or more restraining members are configured to attach between the load and the one or more couplings in order to inhibit movement of the load.

18. A crane according to claim 1, wherein the one or more actuable retractably extendable arms are arranged on either side of the crane body.

19. A crane according to 1, wherein the one or more actuable retractably extendable arms are configurable so as to extend and/or retract from the crane so as to mount or couple with the load.

20. A crane according to claim 1, wherein the crane is configurable such that the device and boom can move independent of each other.

21. A crane according to claim 20, wherein the device and boom are configured to allow the device to be stewed independently with respect to the boom.

22. A crane according to claim 1, wherein the device is removable from the crane.

23. A crane according to claim 22, wherein the device is retrofit to the crane.

24. A method of lifting a load, comprising:
providing a crane according to claim 1,
coupling a load to a lifting region of the hoisting boom of the crane, and
engaging the load with the restraint device, the restraint device extending from the crane, and engaging with the load so as to control movement of that load the with respect to the lifting region in at least one direction.

25. A method according to claim 24, wherein the method includes a step of rotating the crane for transporting and positioning a load onto a vessel.

26. A method according to claim 24, wherein the method includes a step of lifting of an offshore structure or components thereof and subsequently positioning of the offshore structure at an offshore site.

27. A method according to claim 24, wherein the method further comprises a step of transporting an offshore structure to an onshore site.

28. A crane according to claim 1, wherein the load is an offshore structure or components thereof.

29. An offshore structure lifted and/or positioned on a vessel, at an offshore site or at an onshore site by a crane according to claim 1.

30. A vessel comprising one or more cranes according to claim 1.

31. A crane according to claim 1, wherein the device comprises at least one pair of couplings, each coupling of the at least one pair of couplings being provided on a respective arm of the at least one pair of arms, and wherein the arms of the at least one pair of arms are moveable or actuable in a first horizontal direction and the couplings of the at least one pair of couplings are moveable or actuable in a second horizontal direction, the first and second horizontal directions being substantially perpendicular to each other.

32. A crane according to claim 1, wherein the arms of the at least one pair of arms are arranged to be parallel to each other.

33. An apparatus comprising:
a frame configured to be coupled to an offshore structure to allow for lifting of the offshore structure; and
a crane
according to claim 1.

34. A system comprising:
an apparatus for transporting an offshore structure comprising:
a frame;
a crane
according to claim 1; and
a further restraint device configured to restrain the offshore structure and to couple the offshore structure to the apparatus, the further restraint device being arranged at a base of the frame.

35. A system according to claim 34, wherein the further restraint device comprises a clamp having an engagement element, the engagement element being matable with a transport element of a tower of the offshore structure.

36. A system according to claim 34, wherein the restraint device comprises one or more couplings, the one or more couplings being provided on the one or more actuable retractably extendable arms, the one or more couplings being configured to control movement of the load with respect to the lifting region in at least one direction.

* * * * *